(12) United States Patent
Dairokuno et al.

(10) Patent No.: US 6,315,096 B1
(45) Date of Patent: Nov. 13, 2001

(54) FRICTION ENGAGING DEVICE

(75) Inventors: Satoshi Dairokuno, Fujisawa; Yasuhito Koike, Iwata; Yoshio Kinoshita, Shizuoka-ken, all of (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/455,531

(22) Filed: Dec. 7, 1999

(30) Foreign Application Priority Data

Dec. 10, 1998 (JP) .................................................. 10-351988
Jun. 11, 1999 (JP) .................................................. 11-165542

(51) Int. Cl.⁷ ............................. F16D 25/02; F16D 25/04
(52) U.S. Cl. ........................................... 192/35; 192/54.52
(58) Field of Search ............................. 192/35, 36, 17 R, 192/17 A, 54.52, 88 B

(56) References Cited

U.S. PATENT DOCUMENTS

| | | | |
|---|---|---|---|
| 2,251,443 | * | 8/1941 | Fawick ................................ 192/88 B |
| 2,308,679 | * | 1/1943 | Eason ................................. 192/17 R |
| 2,933,171 | * | 4/1960 | Kraeplin .............................. 192/35 |
| 3,000,479 | * | 9/1961 | Mosbacher ........................... 192/35 |
| 5,603,396 | * | 2/1997 | Murata et al. .................. 192/54.52 X |

FOREIGN PATENT DOCUMENTS

| | | |
|---|---|---|
| 3-219123 | 9/1991 | (JP) . |
| 7-259885 | 10/1995 | (JP) . |
| 7-279992 | 10/1995 | (JP) . |
| 10-89381 | 4/1998 | (JP) . |

* cited by examiner

Primary Examiner—Richard M. Lorence
(74) Attorney, Agent, or Firm—Miles & Stockbridge P.C.

(57) ABSTRACT

A friction engaging device capable of obtaining a large transfer torque capacity with a compact and simple construction and smoothly connecting and disconnecting friction engaged members. A wet type multi-disc clutch has a clutch case, a hub and a main clutch. A variable length joint is provided between an inner cylindrical portion of the clutch case and a cylindrical portion of the hub. The variable length joint is constructed mainly of a first cam plate so held as to be slidable in the axial direction on the hub, a second cam plate so held as to be rotatable relatively to the clutch case, and a plurality of rollers interposed between the first and second cam plates. A tube type clutch for making the second cam plate and the clutch case frictionally engage with each other, is provided in a gap between the second cam plate and the inner cylindrical portion of the clutch case.

12 Claims, 17 Drawing Sheets

FRICTION ENGAGING DEVICE

This application claims the benefits of Japanese Application Nos. 10-351988 and 11-165542 which are hereby incorporated by reference.

BACKGROUND OF THE INVENTION

1. Field of the Invention

The present invention relates to a friction engaging device such as a wet type multi-disc clutch etc incorporated into an automatic transmission for an automobile.

2. Related Background Art

Generally, an automatic transmission for an automobile includes, in addition to a torque converter defined as a fluid coupling, a planetary gear transmission mechanism on the order of 3–5 speed ranges, wherein the speed is changed by properly fixing or releasing components (a sun gear and a planetary gear etc) of the planetary gear transmission mechanism by a clutch and a brake. The clutch and the brake built in the automatic transmission involve the use of, excluding some of band type brakes, a wet type multi-disc type in which friction plates and separator plates are alternately disposed. An operation pressure oil from a variable speed control hydraulic circuit is used for fitting the two kinds of plates by pressure. Note that the wet type multi-disc clutch is used as a clutch for disconnecting the power in a motorcycle because of being capable of obtaining a comparatively large torque capacity with a small volume and being easy to make a smooth connection.

FIG. 20 is a vertical sectional view showing principal components of a conventional wet type multi-disc clutch by way of one example thereof. As illustrated in FIG. 20, a wet type multi-disc clutch 1 includes a cylindrical clutch case 2 connected to a certain component of a planetary gear transmission mechanism, a hub 3 connected to another component of the planetary gear transmission mechanism, and a piston 83 internally slidably fitted to a cylinder 81 provided on a proximal side (leftward in FIG. 20) of the clutch case 2. The clutch case 2 encases a plurality of separator plates 13 (four plates in an example shown in FIG. 20) and one single backing plate 19 which are so held as to be slidable in the axial direction, with a cylindrical retainer 85 fixed to an internal surface of the clutch case 2 being interposed therebetween. On the other hand, a plurality of friction plates 17 (four plates in the example shown therein) are so held as to be slidable in the axial direction on the hub 3 in the form of being interposed between the separator plates 13 and between the backing plate 19 and a separator plate 13. Referring again to FIG. 20, the numeral 87 designates an O-ring for sealing between the cylinder 81 and the piston 83, and 89 represents an oil chamber. In the wet type multi-disc clutch 1, when an operation pressure oil from an unillustrated variable speed control hydraulic circuit is introduced into the oil chamber 89, the piston 83 moves rightward in FIG. 20 at a predetermined velocity within the cylinder 81, and the separator plates 13 and the friction plates 17 are pressed by the piston, then press-fitted to each other and thereby frictionally engage with each other.

The prior art wet type multi-disc clutch described above inevitably has a variety of following problems which might arise when attempting to increase a friction engaging area and a pressure of the operation oil in order to ensure a large transfer torque capacity. For example, a method generally implemented for increasing the friction engaging area, is to increase the numbers and diameters of the friction plates 17 and the separator plates 13. If this method is taken, however, there increase the number of components and both of an axial dimension and outside diameter of the clutch case 2, resulting in a difficulty of being incorporated into the transmission. In addition, a weight of the device is bound to considerably increase. Further, though there is a method of enhancing a friction engaging force by raising a pressure of the operation pressure oil while using the same wet type multi-disc clutch, it is required in this case that a discharge pressure of a hydraulic pump be, as a matter of course, increased. Therefore, a high-pressure type hydraulic pump is needed on one hand, and the power dissipated by driving the hydraulic pump also increase on the other hand. If used as a component of the automatic transmission for the automobile, a travelling performance and a fuel consumption of the automobile might decline.

Such being the case, a variety of wet type multi-disc clutches contrived to increase the friction engaging force by use of a cam mechanism have been proposed for obviating the problems given above. What is typical thereof may be a clutch device disclosed in Japanese Patent Application Laid-Open Publication No. 7-259885 (which is hereinafter referred to as prior art 1), and a clutch device disclosed in Japanese Patent Application Laid-Open Publication No. 7-279992 (which is hereinafter referred to as prior art 2). As pointed out by Japanese Patent Application Laid-Open Publication No. 10-89381 (which is hereinafter referred to as prior art 3), however, according to the clutch devices based on the prior arts 1 and 2, once the friction engagement is made by the cam, the cam is firmly fitted in as if driving a wedge, and hence the friction engagement of the clutch can not be released even by depressurizing the operation oil. Namely, in those clutch devices, the clutch is not released till a driving torque in a reverse direction is applied, so that there arises a problem in which a controllability is extremely poor because of being incapable of connecting and disconnecting the clutch only by operating the oil pressure.

Further, the clutch devices according to the prior arts 1 and 2 incorporate a so-called one-way clutch function by which the clutch is automatically released upon a reverse of the direction of the driving torque. Based on this one-way clutch function, however, there is likewise a problem in which the cam is firmly fitted in when the friction engagement is done, then a reverse torque occurs in a driving system the instant the clutch is released, and a variable speed shock due to the occurrence of the reverse torque is transferred to the car body from the automatic transmission. A further defect is that the operation oil pressure is required to be released beforehand for working the one-way clutch function, and switching control of the oil pressure becomes intricate.

Moreover, the clutch devices according to the prior arts 1 and 2, though capable of effecting the automatic release corresponding to the direction of the transfer torque, do not have an automatic connecting function. In the automatic transmission adopting those clutch devices having no such function, when shifted up, a low-gear side clutch is automatically released by connecting a high-gear side clutch, thus completing the gear change. When shifted down, however, it is required that the low-gear side clutch be connected synchronizing with the release of the high-gear side clutch, the gear change must be done based on a clutch-to-clutch method.

On the other hand, the clutch device according to the prior art 3 aims at improving inconvenience caused by the reverse torque described above. However, as disclosed in the specification thereof, the occurrence of the reverse torque, though relieved, could not be completely obviated.

Furthermore, another typical example of the wet type multi-disc clutch using the cam mechanism may be a clutch device disclosed in Japanese Patent Application Laid Open Publication No. 3-219123 (which is hereinafter referred to as prior art 4). In this clutch device, however, in terms of using an electromagnetic clutch for a pilot clutch, there exists a necessity for separately using a magnetic body and a non-magnetic body as materials of the components thereof. In addition, a contrivance for keeping an air gap at a high accuracy is needed, which leads to a problem of largely increasing costs for the device. Incidentally, this clutch device, unlike the clutch devices according to the prior arts 1–3, does not incorporate the one-way clutch function.

SUMMARY OF THE INVENTION

It is a primary object of the present invention, which was devised under such circumstances, to provide as a first mode thereof a friction engaging device capable of obtaining a large transfer torque capacity with a compact simple construction and unrestrictedly connecting and disconnecting friction engaged members.

Another of the present invention is to provide as a second mode thereof a friction engaging device capable of smoothly performing automatic connection and disconnection of the friction engaged members without controlling a pressure of an operation oil with a reverse of direction of a driving torque.

To accomplish the above objects of the present invention, according to a first aspect of the invention, a friction engaging device comprises a first friction engaged member, a second friction engaged member so held as to be relatively rotatable with respect to the first friction engaged member, a first friction engaging member used for providing a friction engagement between the first friction engaged member and the second friction engaged member, a variable length joint provided between the first friction engaging member and the first friction engaged member, and including a first operation element facing to the first friction engaging member and movable in an axial direction and a second operation element so held as to be only relatively rotatable with respect to the first friction engaged member, any one of the first and second operation elements rotating with the second friction engaged member, the first and second operation elements moving away from each other in the axial direction corresponding to the relative rotations in order to make the first friction engaging member perform the engaging operation on one hand, and becoming proximal to each other in the axial direction on the other hand, thus making the relative rotations, and a second friction engaging member used for a friction engagement between the first operation element or the second operation element which does not rotate with the second friction engaged member, and the first friction engaged member.

According to the first aspect of the invention, for example, when the first friction engaged member and the second friction engaged member relatively rotate, the second friction engaging member makes the second operation element frictionally engaged with the first friction engaged member. Thereupon, in the variable length joint, the first operation element and the second operation element move away from each other in the axial direction due to the relative rotations, and the first operation element thrusts the first friction engaging member, thereby actualizing the friction engagement. While on the other hand, when releasing the second friction engaging member, it follows that the second operation element and the first friction engaged member become relatively rotatable. On this occasion, a reactive force of the force for thrusting the first friction engaging member, acts upon the variable length joint, and the first and second operation elements become proximal to each other in the axial direction, thus making the relative rotations. Hence, axial relative positions of the first and second operation elements immediately return to their initial positions, and it follows that the first friction engaging member is released.

According to a second aspect of the present invention, the friction engaging device according to the first aspect may further comprise a return spring, interposed between the first friction engaged member or the second friction engaged member and the first operation element, for biasing the first operation element in such a direction as to move away from the first friction engaging member in the axial direction.

According to the second aspect of the invention, when releasing the second friction engaging member, the first and second operation elements approach each other more surely by the return spring.

According to a third aspect of the present invention, in the friction engaging device according to the first or second aspect of the invention, the first friction engaging member may include a first clutch element rotating with any one of the first friction engaged member and the second friction engaged member, a second clutch element rotating with any other of the first friction engaged member and the second friction engaged member, and a friction material formed on at least any one of the first clutch element and the second clutch element, and used for providing a friction engagement between the two clutch elements.

According to the third aspect of the invention, a transfer torque capacity of the first friction engaging member can be arbitrarily set by increasing or decreasing the numbers of the first clutch elements and of the second clutch elements.

According to a fourth aspect of the present invention, in the friction engaging device according to any one of the first through third aspects of the invention, an operation source of the second friction engaging member may be a pressure fluid.

According to the fourth aspect of the invention, costs for the device can be reduced by use of inexpensive hydraulic pump and circuit which are comparatively simply structured.

According to a fifth aspect of the present invention, in the friction engaging device according to any one of the first through fourth aspects of the invention, the second friction engaging member may be a tube type clutch.

According to the fifth aspect of the invention, the costs for the device can be decreased while ensuring a sufficient friction engaging force.

According to a sixth aspect of the present invention, in the friction engaging device according to any one of the first to fourth aspects of the invention, the second friction engaging member may be a band type brake.

According to the sixth aspect of the invention, it is feasible to ensure a more certain friction engaging force.

According to a seventh aspect of the present invention, a friction engaging device comprises a first friction engaged member, a second friction engaged member so held as to be relatively rotatable with respect to the first friction engaged member, a first friction engaging member used for a friction engagement between the first friction engaged member and the second friction engaged member, a variable length joint provided between the first friction engaging member and the first friction engaged member, and including a first operation element facing to the first friction engaging member and movable in an axial direction and a second operation element so held as to be only relatively rotatable with respect to the first friction engaged member, the first and second operation elements rotating integrally with the first friction engaged member, then moving away from each other in the axial direction corresponding to the relative rotations in order to make the first friction engaging member perform the engaging operation on one hand, and becoming proximal to each other in the axial direction on the other hand, thus making the relative rotations, and a second friction engaging member used for a friction engagement between the first operation element or the second operation element and the second friction engaged member.

According to the seventh aspect of the invention, for instance, when the second friction engaging member is in a non-operating state, the first and second operation elements rotate integrally with the first friction engaged member, and therefore an excessive load is not applied to a bearing etc between the second operation element and the first friction engaged member. Further, when the first and second friction engaged members relatively rotate, the second friction engaging member makes the second operation element frictionally engaged with the second friction engaged member. Thereupon, in the variable length joint, the first operation element and the second operation element move away from each other in the axial direction due to the relative rotations, and the first operation element thrusts the first friction engaging member, thereby actualizing the friction engagement. While on the other hand, when releasing the second friction engaging member, it follows that the second operation element and the first friction engaged member become relatively rotatable. On this occasion, a reactive force of the force for thrusting the first friction engaging member, acts upon the variable length joint, and the first and second operation elements become proximal to each other in the axial direction, thus making the relative rotations. Hence, axial relative positions of the first and second operation elements immediately return to their initial positions, and it follows that the first friction engaging member is released.

According to an eighth aspect of the present invention, the friction engaging device according to the seventh aspect may further comprise a return spring, interposed between the first friction engaged member or the second friction engaged member and the first operation element, for biasing the first operation element in such a direction as to move away from the first friction engaging member in the axial direction.

According to the eighth aspect of the invention, when releasing the second friction engaging member, the first and second operation elements approach each other more surely by the return spring.

According to a ninth aspect of the present invention, in the friction engaging device according to the seventh or eighth aspect of the invention, the first friction engaging member may include a first clutch element rotating with any one of the first friction engaged member and the second friction engaged member, a second clutch element rotating with any other of the first friction engaged member and the second friction engaged member, and a friction material formed on at least any one of the first clutch element and the second clutch element, and used for providing a friction engagement between the two clutch elements.

According to the ninth aspect of the invention, a transfer torque capacity of the first friction engaging member can be arbitrarily set by increasing or decreasing the numbers of the first clutch elements and of the second clutch elements.

According to a tenth aspect of the present invention, in the friction engaging device according to any one of the seventh through ninth aspects of the invention, an operation source of the second friction engaging member may be a pressure fluid.

According to the tenth aspect of the invention, costs for the device can be reduced by use of inexpensive hydraulic pump and circuit which are comparatively simply structured.

According to an eleventh aspect of the present invention, in the friction engaging device according to any one of the seventh through tenth aspects of the invention, the second friction engaging member may be a tube type clutch.

According to the eleventh aspect of the invention, the costs for the device can be decreased while ensuring a sufficient friction engaging force.

According to a twelfth aspect of the present invention, in the friction engaging device according to any one of the seventh to eleventh aspects of the invention, the second friction engaging member may be a band type brake.

According to the twelfth aspect of the invention, it is feasible to ensure a more certain friction engaging force.

According to a thirteenth aspect of the present invention, in the friction engaging device according to any one of the first through twelfth aspects of the invention, the variable length joint may be constructed so that the first and second operation elements move away from each other in the axial direction corresponding to the relative rotations in one direction in order to make the first friction engaging member perform the engaging operation on one hand, and become proximal to each other in the axial direction on the other hand, thus making the relative rotations in the other direction.

According to the thirteenth aspect of the invention, for example, when the first friction engaged member and the second friction engaged member relatively rotate (forward rotations) in one direction, the second friction engaging member makes the second operation element frictionally engaged with the first friction engaged member. Thereupon, in the variable length joint, the first operation element and the second operation element move away from each other in the axial direction due to the relative rotations, and the first operation element thrusts the first friction engaging member, thereby actualizing the friction engagement. While on the other hand, when the first friction engaged member and the second friction engaged member relatively rotate (reverse rotations), even if the second friction engaging member makes the second operation element frictionally engaged with the first friction engaged member, in the variable length joint, the first and second operation elements, though relatively rotate, do not move away from each other in the axial direction. The first friction engaging member does not fall into the friction engagement.

On the other hand, when the first and second friction engaged members make the forward rotations, and the first friction engaging member comes into the friction engagement, in which state the first and second friction engaged members change to the reverse rotations. Thereupon, for instance, a rotational torque transferred to the first friction engaged member from the second friction engaged member decreases down to minus via zero. On this occasion, the first friction engaging member has the clutch element connected with a predetermined clearance in the rotating direction to the first friction engaged member, and hence, just when the rotational torque comes to 0, the second friction engaged member and the first operation element of the variable length joint become integrally relatively rotatable with respect to the first friction engaged member. On the other hand, the reactive force which thrusts the first friction engaging member, acts upon the variable length joint, and the second friction engaged member, the first operation element and the first friction engaging member are rotated by this reactive force in such a direction that the axial relative positions of the first and second operation elements shift back to the initial positions. The thrusting force by the first operation element thereby disappears, and the first friction engaging member is automatically released, whereby the second friction engaged member reversely rotates with respect to the first friction engaged member. At that time, as explained above, since the first friction engaging member has been released, the reverse torque due to the above-mentioned does not occur. Further, the second operation element and the first friction engaged member remain connected by the second friction engaging member. The variable length joint does not, however, transfer the rotations during the reverse rotations, and hence the reverse torque due to this is not produced.

Furthermore, when the first and second friction engaged members again shift to the forward rotations from that state, the first operation element of the variable length joint rotates forward as the second friction engaged member rotates on one hand, and the second operation element is locked in the rotating direction with respect to the first friction engaged member. Therefore, the first and second operation elements move away from each other in the axial direction with the relative rotations, and the first friction engaging member is thrust by the second operation element, thereby actualizing the automatic friction engagement.

According to a fourteenth aspect of the present invention, in the friction engaging device according to the thirteenth aspect of the invention, the variable length joint may further include a third operation element interposed between the first operation element and the second operation element. A cam may be formed on at least one of a contact surface between the first operation element and the third operation element, and a contact surface between the second operation element and the third operation element. An inclined angle $\theta$ of the cam and a friction coefficient $\mu$ between the first operation element and the third operation element or between second operation element and the third operation element, may have a relationship such as $\mu \geq \tan(\theta/2)$ with respect to the relative rotations in such a direction that the first operation element and the second operation element move away from each other in the axial direction, and have a relationship such as $\mu < \tan(\theta/2)$ with respect to the relative rotations in such a direction that the first operation element and the second operation element do not move away from each other in the axial direction.

According to the fourteenth aspect of the invention, the first and second operation elements perform smoothly their operations.

According to a fifteenth aspect of the present invention, in the friction engaging device according to the thirteenth aspect of the invention, the variable length joint may further include a third operation element interposed between the first operation element and the second operation element. Both of the contact surface between the first operation element and the third operation element and the contact surface between the second operation element and the third operation element, may be plane, and the third operation element may be a sprag operating only for the relative rotations in such a direction that the first operation element and the second operation element move away from each other in the axial direction.

According to the fifteenth aspect of the invention, the first and second operation elements become easier to be manufactured, which enables the manufacturing costs to decrease.

According to sixteenth aspect of the present invention, in the friction engaging device according to any one of the first through fifteenth aspects of the invention, any one of the first operation element and the second operation element may be integral with the first friction engaged member or the second friction engaged member.

According to the sixteenth aspect of the invention, the numbers of working steps and assembly steps are reduced with the decrease in the number of components.

DESCRIPTION OF THE PREFERRED EMBODIMENTS

First through tenth embodiments in which the present invention is applied to a wet type multi-disc clutch for an automatic transmission, will hereinafter be described in depth with reference to the accompanying drawings.

Figure 1:
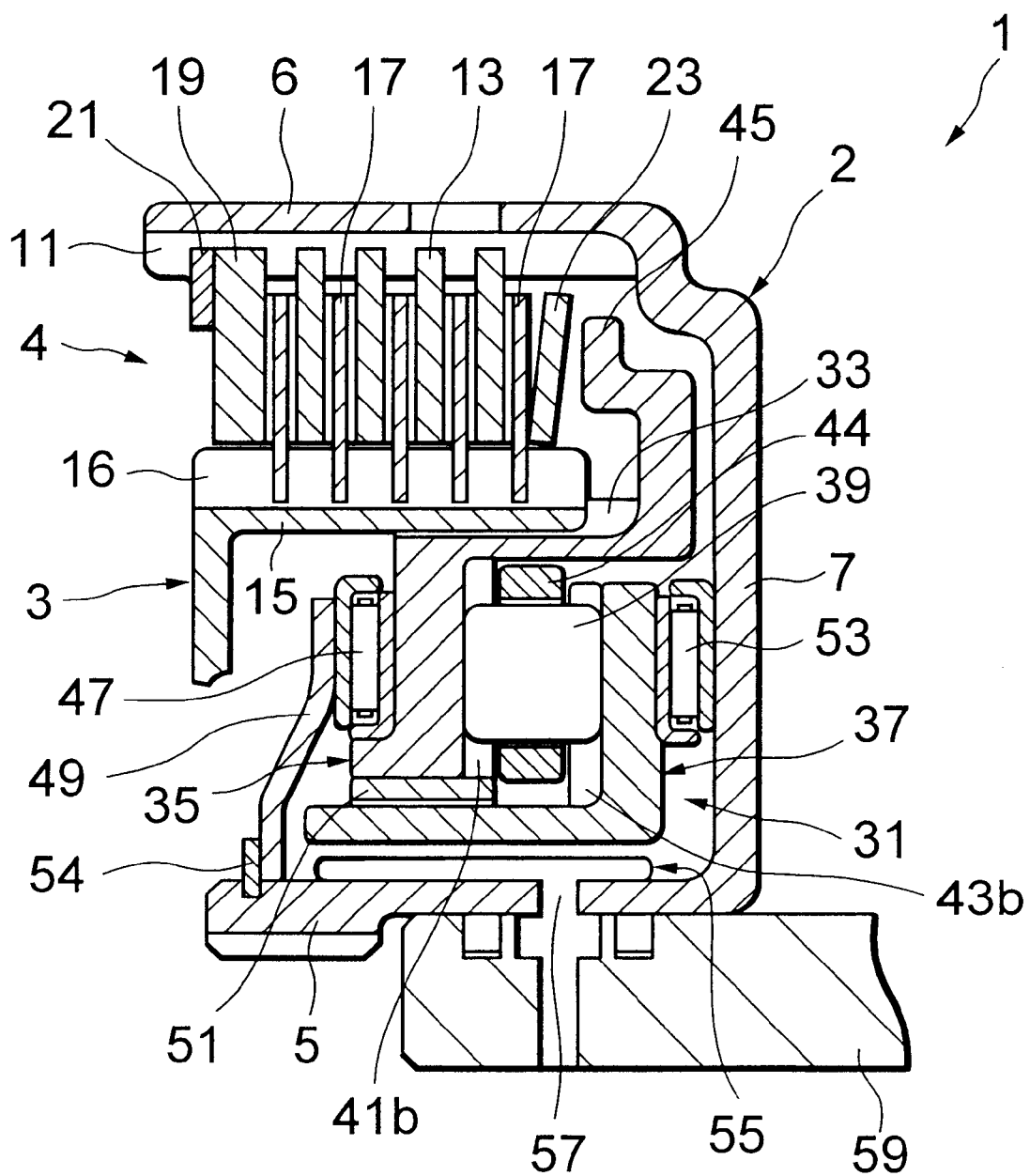
FIG. 1 is a vertical sectional view showing principal components of a wet type multi-disc clutch in a first embodiment of the present invention.

FIG. 1 is a vertical sectional view showing principal components of the wet type multi-disc clutch in the first embodiment. As illustrated in FIG. 1, a wet type multi-disc clutch 1 includes a cylindrical clutch case 2 defined as a first friction engaged member connected to a certain component of a planetary gear transmission mechanism, a hub 3 classified as a second friction engaged member connected to another component of the planetary gear transmission mechanism, and a main clutch 4 serving as a first friction engaging member used for a frictional engagement between the clutch case 2 and the hub 3.

The clutch case 2 is constructed of an inner cylindrical portion 5, an outer cylindrical portion 6 and a panel plate 7, and thus takes a dual cylindrical shape. A plurality of separator plates 13 (four plates in an example shown in the Figure) defined as a component of the main clutch 4, are so held as to be slidable in an axial direction through a spline 11 on an inner peripheral surface of the outer cylindrical portion 6. Further, the hub 3 has a cylindrical portion 15 fitted in between the inner cylindrical portion 5 and the outer cylindrical portion 6 of the clutch case 2. A plurality of friction plates 17 (five plates in an example shown in the Figure) defined as a component of the main clutch 4, are so held as to be slidable in the axial direction through a spline 16 on an outer peripheral surface of the cylindrical portion 15. A member designated by the numeral 19 in FIG. 1 is a backing plate engaged with the inner peripheral surface of the clutch case 2 by use of a snap ring 21, and a member denoted by the numeral 23 is a Belleville spring. The friction plates 17 described above are alternately interposed between the respective separator plates 13 in an area between the backing plate 19 and the Belleville spring 23.

Figure 2:
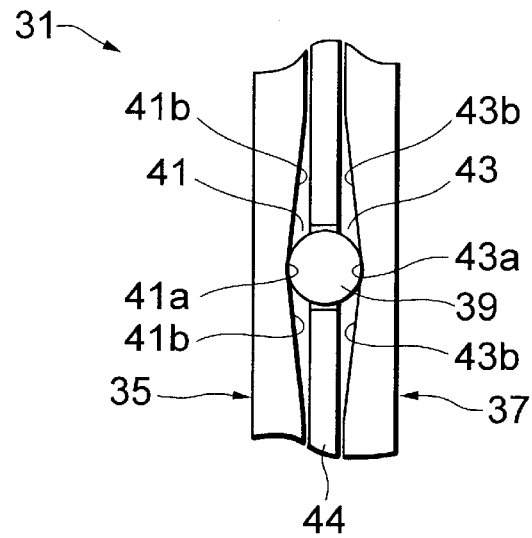
FIG. 2 is an explanatory view showing a structure of a variable length joint in the first embodiment.
Figure 3:
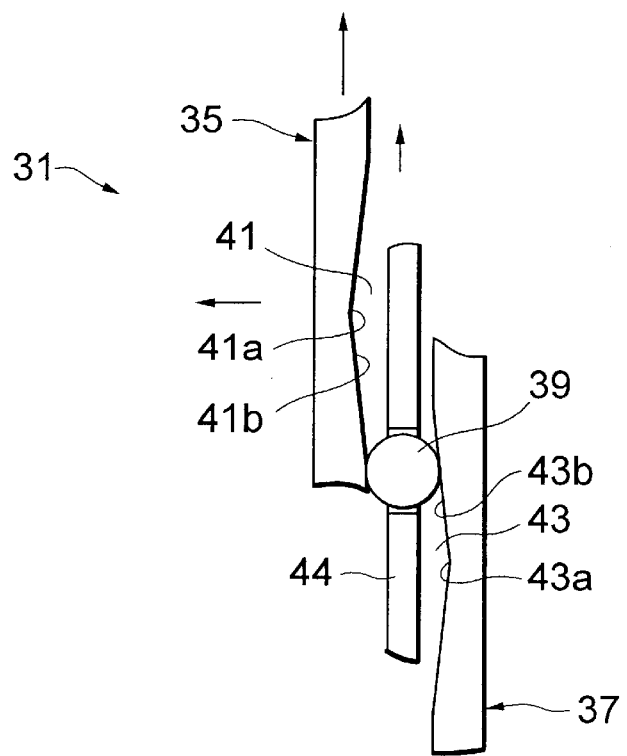
FIG. 3 is an explanatory view showing an operating state of the variable length joint in the first embodiment.

In the first embodiment, a variable length joint 31 is disposed between the inner cylindrical portion 5 of the clutch case 2 and the cylindrical portion 15 of the hub 3. Main constructive members of the variable length joint 31 are a first cam plate 35 as a first operation element so held as to be slidable on the inner cylindrical portion 15 of the hub 3 in the axial direction through a spline 33, a second cam plate 37 as a second operation element extending to oppose to the panel plate 7 and the inner cylindrical portion 5 of the clutch case 2, and a plurality of rollers 39 (three rollers in the first embodiment) as a third operation element which are interposed between the two cam plates 35 and 37. As shown in FIG. 2, the first and second cam plates 35, 37 are formed with concave cams 41 and 43, and the roller 39 is disposed at troughs 41a, 43a of those cams 41, 43. Accordingly, when the first cam plate 35 and the second cam plate 37 make relative rotations, as shown in FIG. 3, the roller 39 rolls along inclined surfaces 41b, 43b of the cams 41, 43, whereby the first cam plate 35 is thrust away from the second cam plate 37. In the Figures, a member designated by the numeral 44 is a retainer ring for retaining the roller 39.

The first cam plate 35 has a piston member 45 provided on an outer peripheral side thereof and facing to the Belleville spring 23 of the main clutch 4. The first cam plate 35 is biased toward the second cam plate 37 by an annular return spring 49 held through a needle bearing 47 in the inner cylindrical portion 5 of the clutch case 2. Further, the second cam plate 37 is so held as to be relatively rotatable and relatively slidable through a slide bearing 51 on the first cam plate 35 on one hand, and is so supported as to be relatively rotatable through a needle bearing 53 on the panel plate 7 of the clutch case 2 on the other hand. A member denoted by 54 in the Figures is a snap ring for securing the return spring 49 to the inner cylindrical portion 5.

On the other hand, a tube type clutch 55 classified as a second friction engaging member (a pilot clutch) is disposed in a gap between the second cam plate 37 and the inner cylindrical portion 5 of the clutch case 2. The tube type clutch 55 in the first embodiment is configured such that a flat tube composed of a synthetic rubber is formed in an annular shape. The tube type clutch 55 swells upon a supply of an operation pressure oil from an operation pressure oil hole 57 formed in the inner cylindrical portion 5, and thereby frictionally engages with both of the second cam plate 37 and the clutch case 2. A member denoted by 59 in the Figures is a hollowed shaft as a component of the planetary gear transmission mechanism, through which the operation pressure oil is supplied to the oil supply hole 57 from an unillustrated variable speed control hydraulic circuit.

An operation of the first embodiment will hereinafter be described by exemplifying a case of stopping rotations of the hub 3 by making a friction-engagement of the hub 3 on the rotating side with the clutch case 2 on the fixed side.

When the hub 3 rotates, the friction plates 17 and the first cam plate 35 which are spline-engaged with the hub 3 rotate. The roller 39 is engaged with the cams 41 and 43 of the first and second cam plates 35, 37, and therefore the roller 39 and the second cam plate 37 rotate synchronizing with the hub 3. On this occasion, the first cam plate 35 is pressed toward the second cam plate 37 by the return spring 49, with the result that the roller 39 is fitted in between the troughs 41a, 43a of the cams 41, 43. A positional relationship between those members becomes a state as shown in FIGS. 1 and 2. Further, the needle bearing 47 is provided between the return spring 49 and the first cam plate 35, and the needle bearing 53 is provided between the clutch case 2 and the second cam plate 37, whereby almost no rotational resistance acts upon each of the members rotating in synchronization with the hub 3. A loss of the driving force can be thereby kept small.

Figure 4:
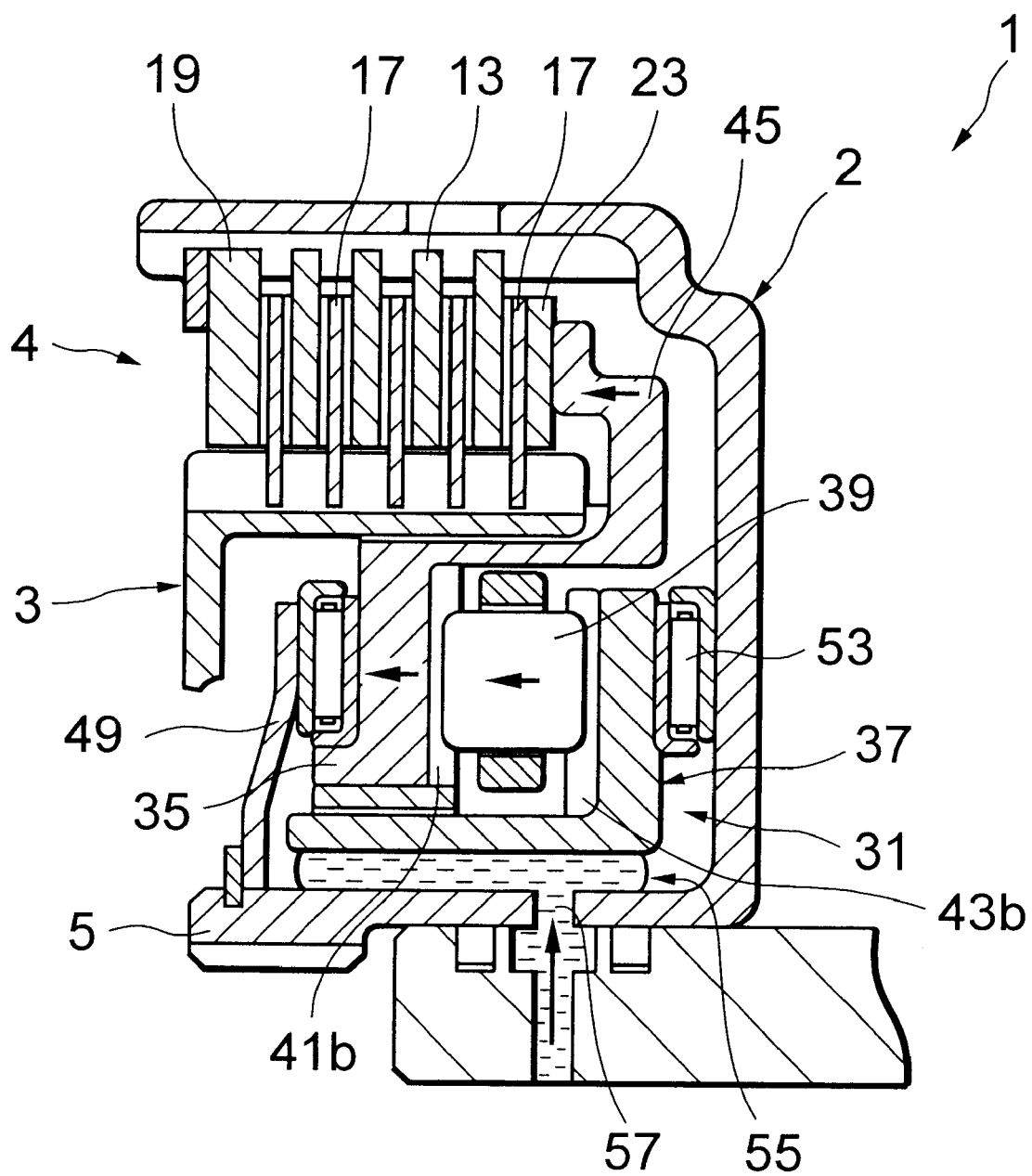
FIG. 4 is a principal vertical sectional view showing an operating state of the principal components of the wet type multi-disc clutch in the first embodiment of the present invention.

Now, when the tube type clutch 55 is supplied with the operation pressure oil from the variable speed control hydraulic circuit through the oil supply hole 57, the tube type clutch 55, as illustrated in FIG. 4, swells between the second cam plate 37 and the inner cylindrical portion 5 of the clutch case 2. Thereupon, the second cam plate 37 is brought into contact with the tube type clutch 55 and thereby receives a friction braking force, thus making relative rotations to the first cam plate 35 rotating in synchronization with the hub 3. With this operation, as shown in FIG. 3, the roller 39 rolls along the inclined surfaces 41b, 43b of the cams 41, 43 of the two cam plates 35, 37, and it follows that the two cam plates 35, 37 move away from each other in the axial direction, and that the variable length joint 31 operates so as to stretch. On this occasion, the second cam plate 37 engages with the clutch case 2 via the needle bearing 53, and hence the first cam plate 35 moves leftward in FIG. 4 resisting a biasing force of the return spring 49, and a piston member 45 thereof thrusts the main clutch 4 through the Belleville spring 23. As a result, the separator plates 13 and the friction plates 17 are thrust toward the backing plate 19 and thereby press-contacted to each other, thus engaging the main clutch with the result that the rotations of the hub 3 stop. Note that a force of the piston member 45 pressing the main clutch 4 can be properly set corresponding to configurations (depths of the troughs 41a, 43a) of the cams 41, 43 and a spring force of the Belleville spring 23 in the first embodiment.

On the other hand, when the main clutch 4 is in its joined state, the operation pressure oil within the tube type clutch 55 is discharged via the variable speed control hydraulic circuit. Then, a friction braking force caused by the contact of the tube type clutch 55 with the second cam plate 37 disappears, and hence the second cam plate 37 becomes rotatable relatively to the clutch case 2. Thereupon, reaction of the force of the piston member 45 pressing the main clutch 4, works as a force (restoring force) for making the first and second cam plates 35, 37 proximal to each other. Therefore, with the roller 39 being positioned on the inclined surfaces 41b 43b of the cams 41, 43, a rotation-directional component of the restoring force is generated, whereby the first and second cam plates 35, 37 rotate in a direction opposite to the previous direction. The roller 39 thereby rolls on the inclined surfaces 41b, 43b of the cams 41, 43, and is thus fitted in between the troughs 41a, 43a. Then, the roller 39 and the first cam plate 35 return to the positions shown in FIGS. 1 and 2, and it follows that the variable length joint 41 operates to shrink. As a result, an axial length of the variable length joint 31 returns to its initial value, the main clutch 4 assumes a released state, and the hub 3 again becomes rotatable. Note that there exists the biasing forces of the Belleville spring 23 and of the return spring 49, and therefore the variable length joint 31 reverts to the initial state thereof more surely in the first embodiment.

As discussed above, in the first embodiment of the present invention, the main clutch 4 is unrestrictedly joined and released simply by supplying and discharging the operation pressure oil to and from the tube type clutch 55. It is also feasible to increase the friction engaging force of the main clutch 4 without scaling up the friction engagement elements nor enhancing a pressure of the operation pressure oil. Further, when releasing the main clutch 4, the second cam plate 37 of the variable length joint 31 becomes rotatable with respect to the clutch case 2, and the smooth release can be thereby attained without causing the wedge action as seen in the prior art device.

Figure 5:
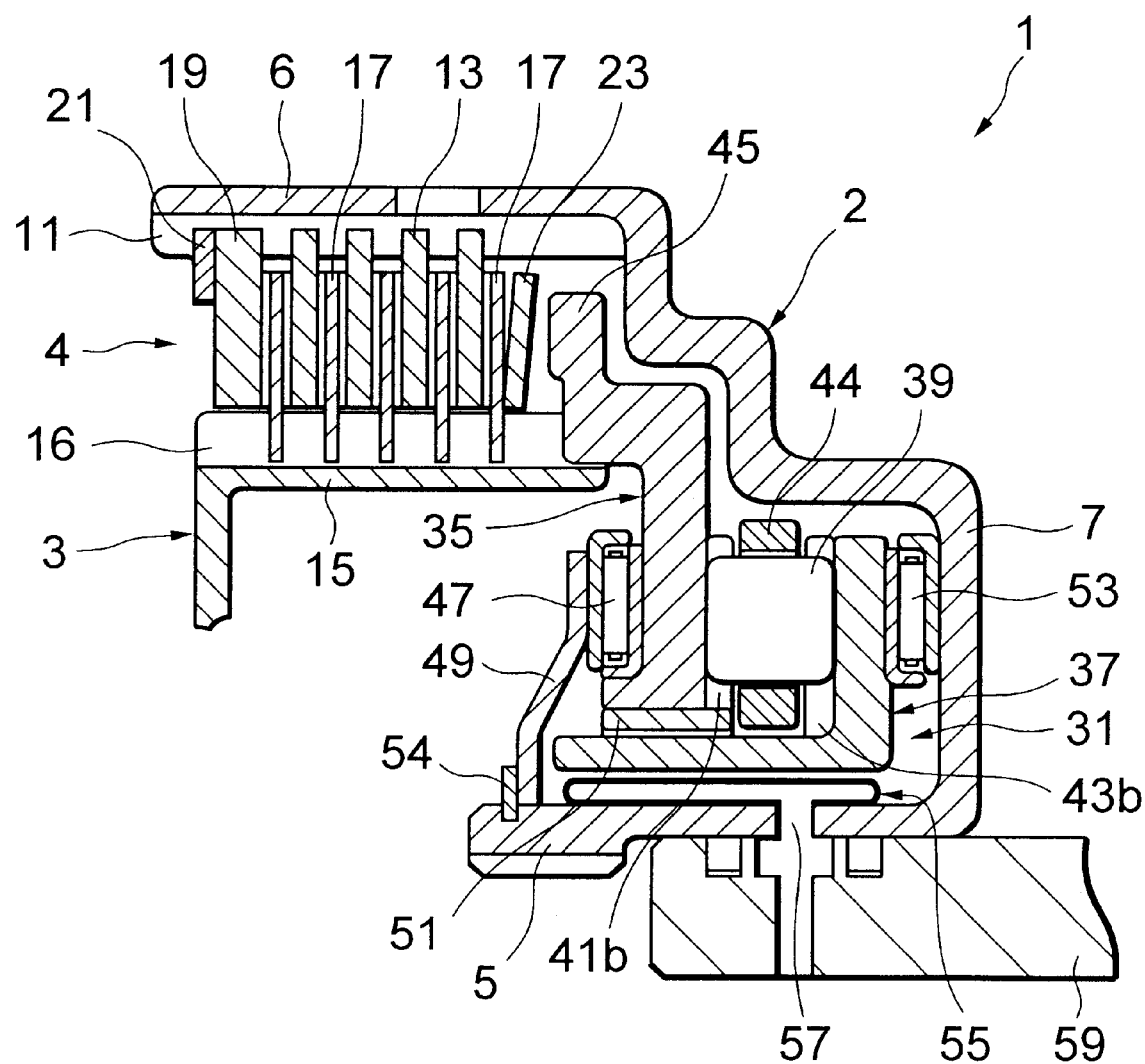
FIG. 5 is a vertical sectional view showing the principal components of the wet type multi-disc clutch in a second embodiment of the present invention.

FIG. 5 is a vertical sectional view showing principal components of the wet type multi-disc clutch in accordance with a second embodiment of the present invention. As illustrated in FIG. 5, in this wet type multi-disc clutch 1, the basic structures and operations of the main clutch 4 and of the variable length joint 31 are the same as those in the first embodiment discussed above. However, the configuration of the first cam plate 35 is more simplified. Further, incidental to this simplification, an entire length of the clutch case 2 increases, and, in addition to this, the first cam plate 35 engages with the spline 16, for the friction plate 17, formed on the cylindrical portion 15 of the hub 3. In the wet type multi-disc clutch 1 in accordance with the second embodiment, manufacturing of the first cam plate 35 and the hub 3 is facilitated, and a space large enough to dispose the planetary gear etc is formed on the side of the inner periphery of the hub 3.

Figure 6:
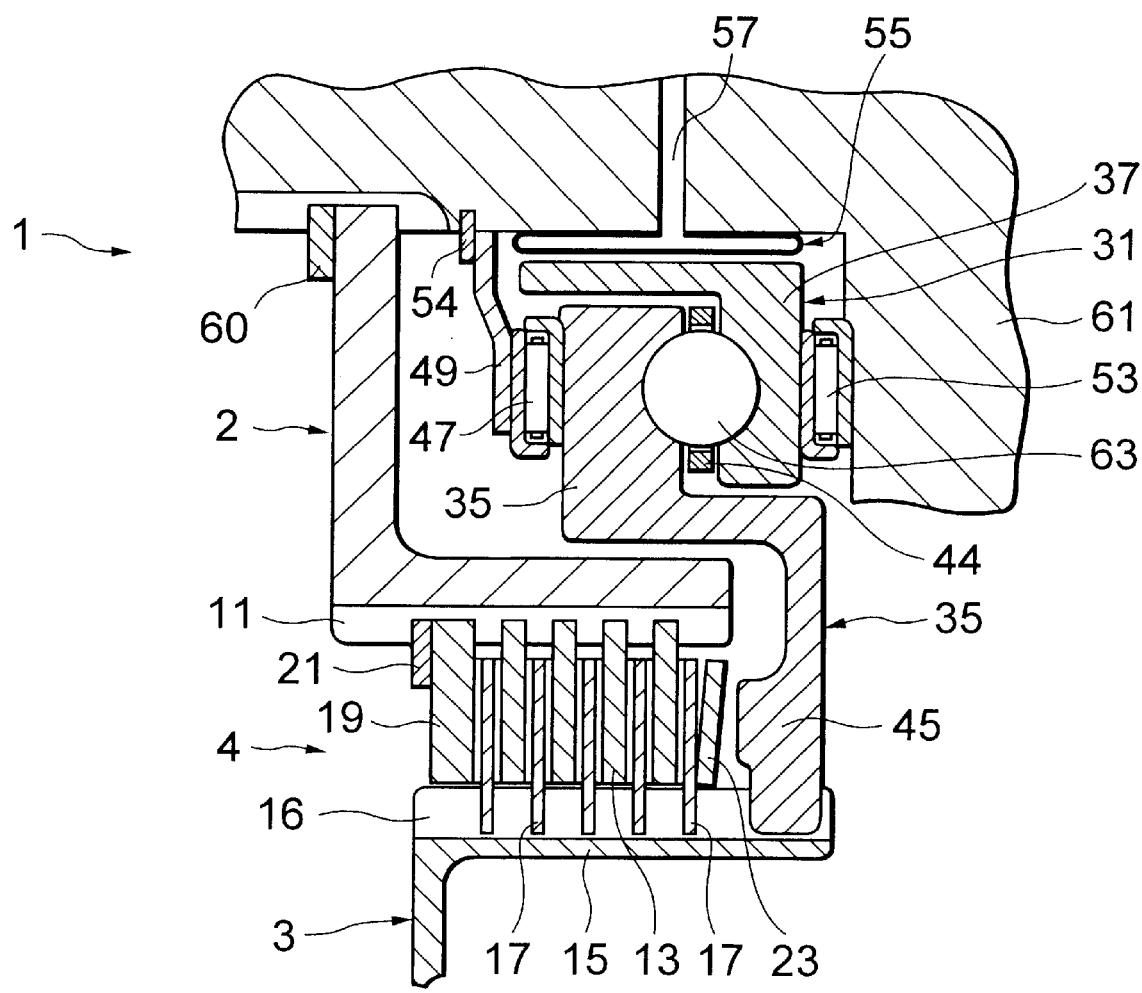
FIG. 6 is a vertical sectional view showing the principal components of the wet type multi-disc clutch in a third embodiment of the present invention.
Figure 7:
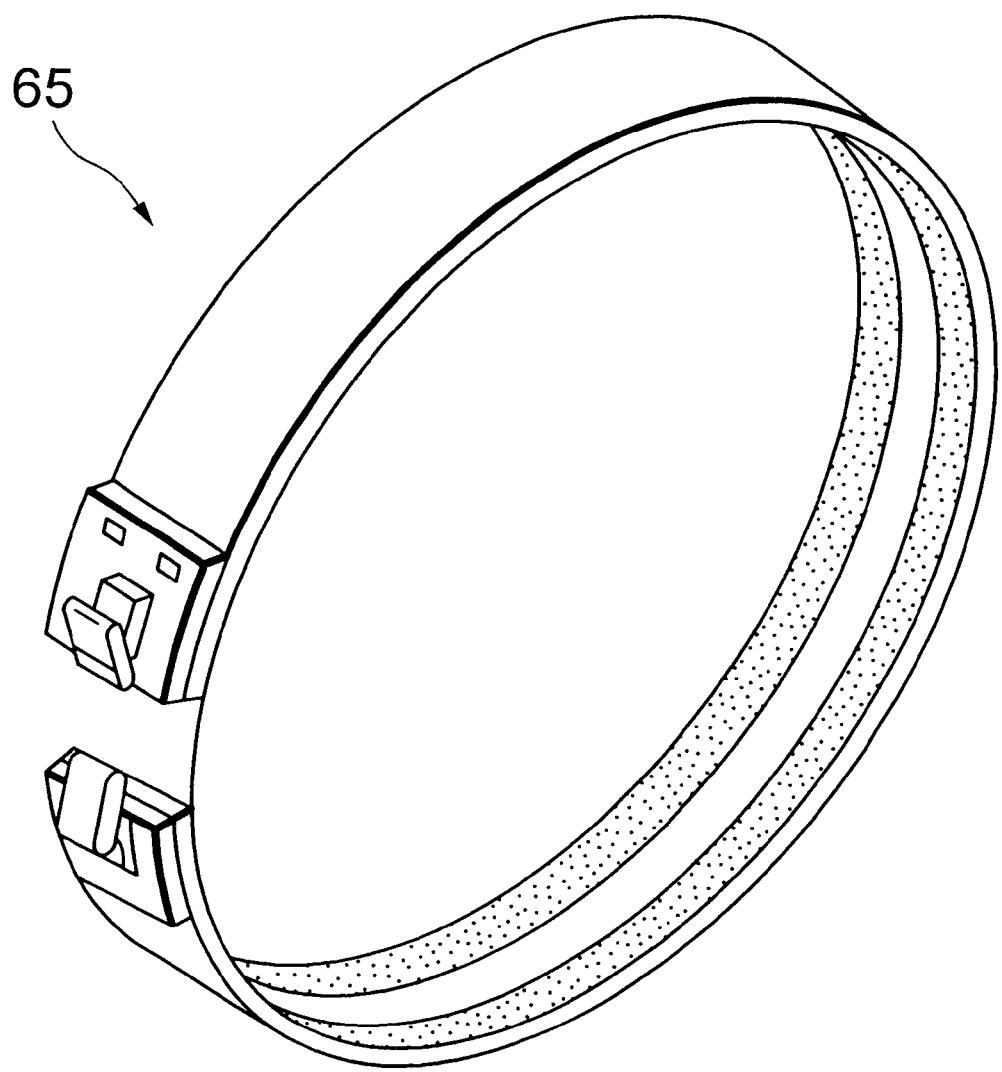
FIG. 7 is a perspective view showing a band type rake.

FIG. 6 is a vertical sectional view showing principal components of the wet type multi-disc clutch in accordance with a third embodiment of the present invention. As illustrated in FIG. 6, in this wet type multi-disc clutch 1 also, the basic structures and operations of the main clutch 4 and of the variable length joint 31 are substantially the same as those in the first embodiment discussed above. However, a geometry of the respective members is different. To be specific, in the third embodiment, the variable length joint 31 is disposed inwardly of a fixed case 61 such as a transmission case etc which is fixed to the clutch case 2 through a snap ring 60, and further the main clutch 4 and the hub 3 are disposed inwardly of the variable length joint 31. Moreover, a ball 63 is interposed instead of the roller in between the first cam plate 35 and the second cam plate 37 of the variable length joint 31. In the wet type multi-disc clutch 1 in the third embodiment, the tube type clutch 55 is positioned on the side of the inner peripheral surface of the fixed case, and therefore a band type brake 65 shown in a perspective view in FIG. 7 may also be used as a substitute for the clutch 55.

Figure 8:
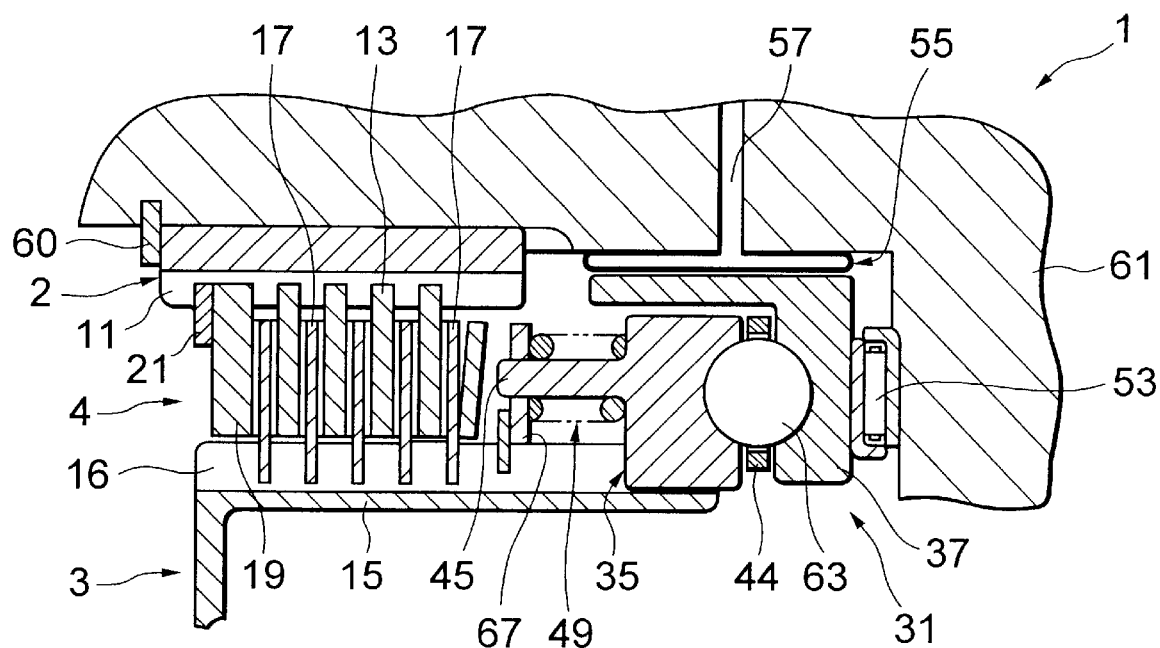
FIG. 8 is a vertical sectional view showing the principal components of the wet type multi-disc clutch in a fourth embodiment of the present invention.

FIG. 8 is a vertical sectional view showing principal components of the wet type multi-disc clutch in accordance with a fourth embodiment of the present invention. As illustrated in FIG. 8, this wet type multi-disc clutch 1 is a modified version of what has been exemplified in the third embodiment. However, the basic structures and operations of the main clutch 4 and of the variable length joint 31 are substantially the same as those in the first embodiment discussed above. In accordance with the fourth embodiment, the main clutch 4 and the variable length joint 31 are disposed in series, and a rod-like piston member 45 protrudes from the first cam plate 35 toward the main clutch 4. Further, in the fourth embodiment, a plurality of coil-like return springs 49 are used herein and wound on the piston member 45. The return springs 49 are secured to a spring securing plate 67 fitted to the cylindrical portion 15 of the hub 3. In the wet type multi-disc clutch 1 in the fourth embodiment, a dimension of the device in the radial direction is extremely small, and therefore, the space can be effectively utilized, and in addition the band type brake 65 may also be used as in the third embodiment.

Figure 9:
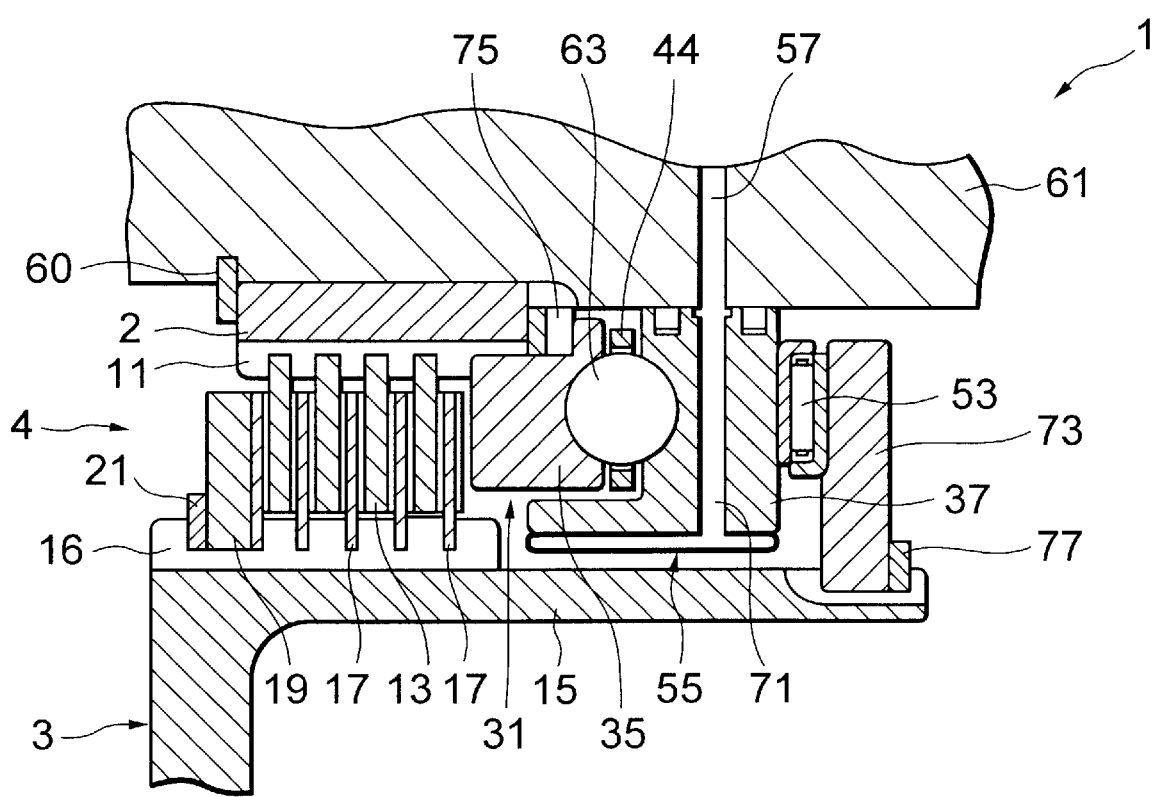
FIG. 9 is a vertical sectional view showing the principal components of the wet type multi-disc clutch in a fifth embodiment of the present invention.

FIG. 9 is a vertical sectional view showing principal components of the wet type multi-disc clutch in accordance with a fifth embodiment of the present invention. As illustrated in FIG. 9, this wet type multi-disc clutch 1 is a further modified version of what has been exemplified in the fourth embodiment, wherein the first cam plate 35 is contrived to press directly the main clutch 4. The basic structures and operations of the main clutch 4 and of the variable length joint 31 are, however, substantially the same as those in the first embodiment discussed above. In accordance with the fifth embodiment, the tube type clutch 55 is disposed between the cylindrical portion 15 of the hub 3 and the second cam plate 37, and the second cam plate 37 is formed with an oil supply hole 71 communicating with the oil supply hole 57 on the side of the fixed case 61. Further, the first cam plate 35 engages through the spline with the clutch case 2 fixed to the fixed case 61, and the second cam plate 37 is supported through the needle bearing 53 by a backup plate 73 engaged with the hub 3. A member designated by the numeral 75 in FIG. 9 is a wave spring for generating a friction engaging force between the clutch case 2 and the first cam plate 35. A member denoted by 77 is a snap ring for fixing the backup plate 73 to the hub 3. In accordance with the fifth embodiment, the member (the tube type clutch 55) disposed on the side of the fixed case 61 in the first to fourth embodiments, is disposed on the side of the second cam plate 37. Further, the member (the first cam plate 35) disposed on the side of the hub 3 is disposed on the side of the fixed case 61, and hence the rotational operation is reversed. The stretching operation etc of the variable length joint 31 is, however, performed in the same way.

Figure 10:
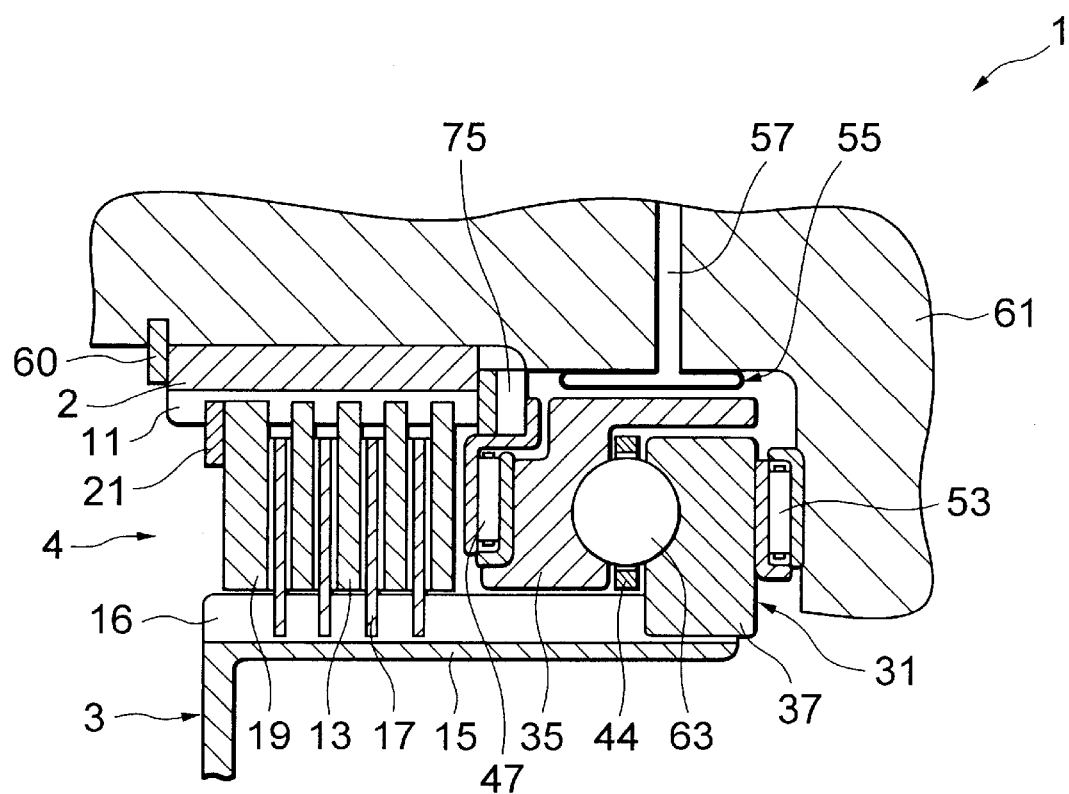
FIG. 10 is a vertical sectional view showing the principal components of the wet type multi-disc clutch in a sixth embodiment of the present invention.

FIG. 10 is a vertical sectional view showing principal components of the wet type multi-disc clutch in accordance with a sixth embodiment of the present invention. As illustrated in FIG. 10, this wet type multi-disc clutch 1 is a still further modified version of what has been exemplified in the fourth embodiment. However, the basic structures and operations of the main clutch 4 and of the variable length joint 31 are substantially the same as those in the first embodiment discussed above. In accordance with the sixth embodiment, unlike the first to fifth embodiments discussed above, the tube type clutch 55 is provided between the first cam plate 35 defined as a first operation element of the variable length joint 31, and the fixed case 61. Further, the needle bearing 47 is interposed between the first cam plate 35 and a separator plate 13 in order to smoothly make the relative rotations between the first cam plate 35 and the second cam plate 37 when in the engagement of the main clutch 4. Note that when the variable length joint 31 operates to stretch, the first cam plate 35 displaces by a slight quantity (e.g., approximately 1 mm) leftward in FIG. 10. However, the tube type clutch 55 flexibly deforms enough to absorb the displacement thereof, and it never happens that the first cam plate 35 might be broken. Further, the engagement elements move along the spline, thereby absorbing the displacement of the first cam plate 35.

Figure 11:
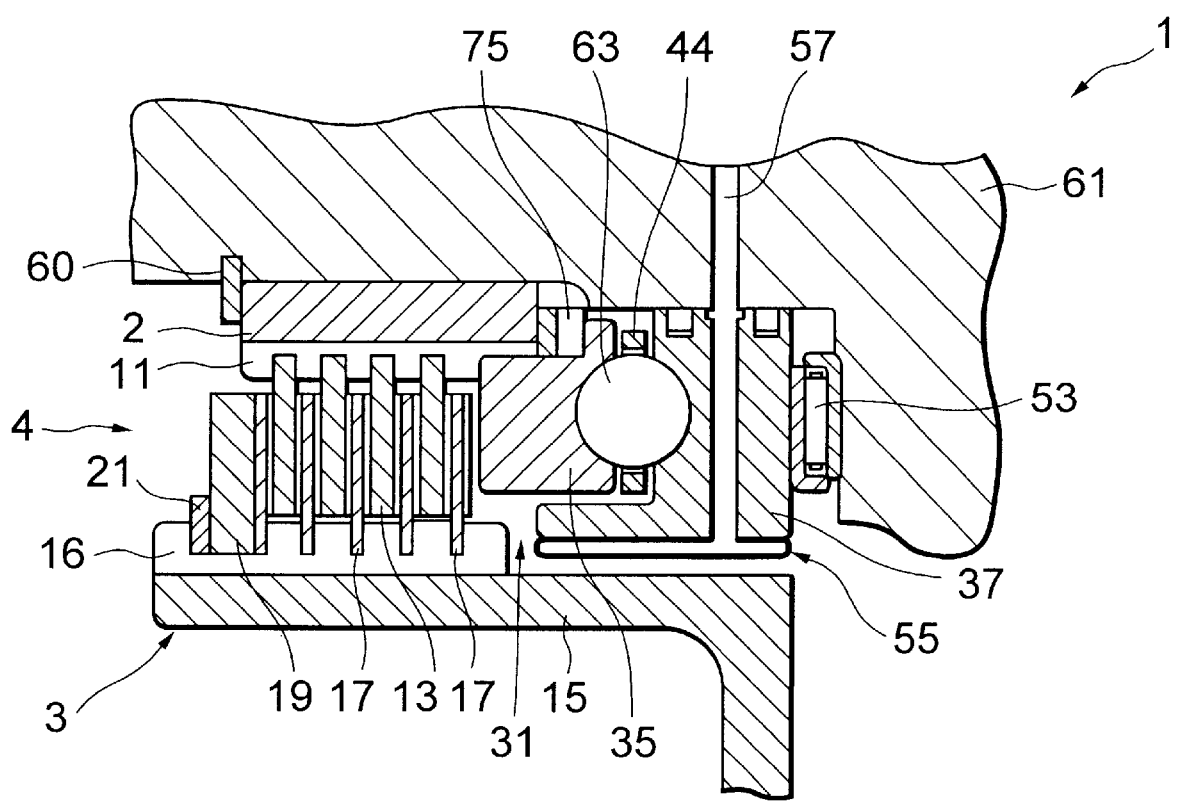
FIG. 11 is a vertical sectional view showing the principal components of the wet type multi-disc clutch in a seventh embodiment of the present invention.

FIG. 11 is a vertical sectional view showing principal components of the wet type multi-disc clutch in a seventh embodiment of the present invention. As illustrated in FIG. 11, this wet type multi-disc clutch 1 is constructed by changing a method of holding mainly the variable length joint 31 as compared with the fifth embodiment discussed above. That is, in the seventh embodiment, the main clutch 4 and the variable length joint 31 are disposed in series as in the fifth embodiment, and the first cam plate 35 frictionally engages with the clutch case 2 by dint of an operation of wave spring 75. However, the second cam plate 37 is so supported as to be relatively rotatable on the side of the fixed case 61 (the clutch case 2) classified as a first friction engaged member through the needle bearing 53. Note that the basic structures and operations of the main clutch 4 and of the variable length joint 31 in the seventh embodiment are substantially the same as those in the first embodiment discussed above.

According to the seventh embodiment, with such a construction being adopted, the second cam plate 37 does not rotate in synchronization with the hub 3 when the main clutch 4 is not engaged, and consequently the second plate 37 (i.e., the variable length joint 31) and the fixed case 61 integrally rotate. Therefore, for example, even when an automobile travels at a high speed, the hub 3 makes several thousands of revolutions per minute with respect to the fixed case 61, no load in the rotating direction is applied to the needle bearing 53, and a life-span of the needle bearing 53 considerably increases, thereby attaining an extension of a maintenance interval of the automatic transmission.

Figure 12:
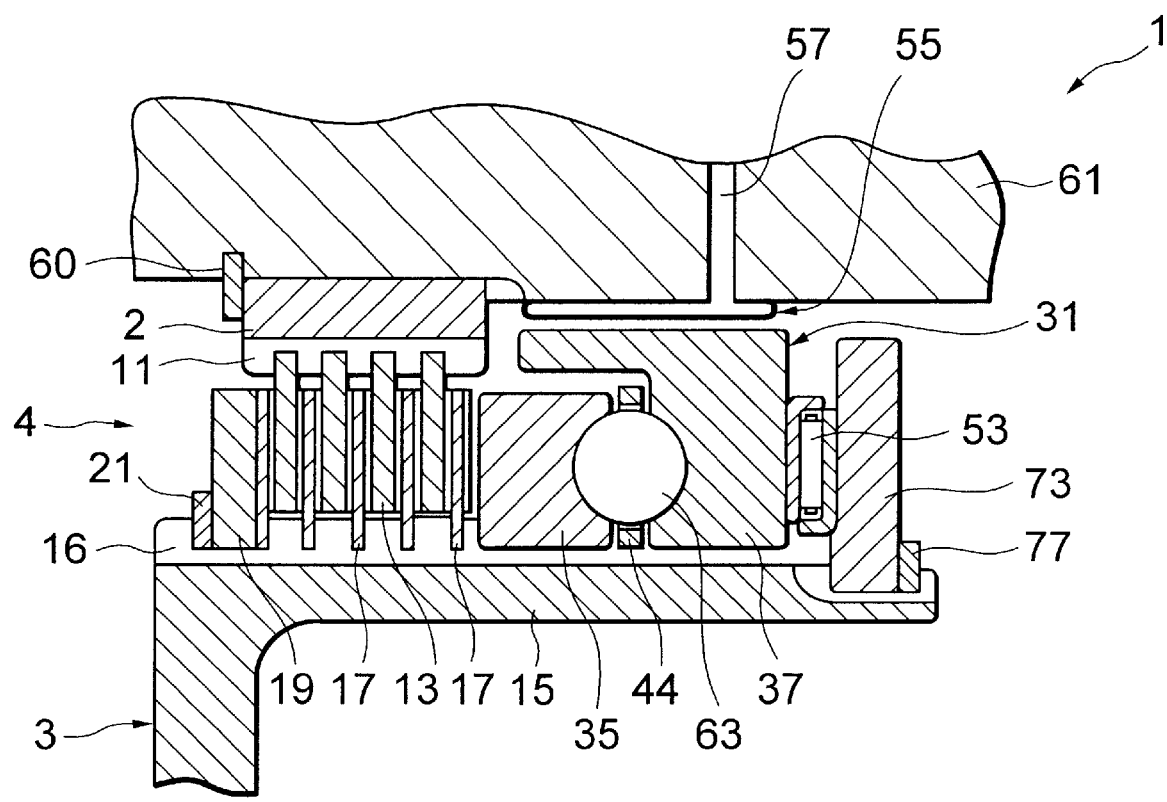
FIG. 12 is a vertical sectional view showing the principal components of the wet type multi-disc clutch in an eighth embodiment of the present invention.

FIG. 12 is a vertical sectional view showing principal components of the wet type multi-disc clutch in an eighth embodiment of the present invention. As illustrated in FIG. 12, this wet type multi-disc clutch 1 is constructed by changing a method of holding mainly the variable length joint 31 as compared with the fourth embodiment discussed above. That is, in the eighth embodiment, the main clutch 4 and the variable length joint 31 are disposed in series as in the fourth embodiment, and the first cam plate 35 engages with the hub 3 through the spline 16. However, the second cam plate 37 is so supported as to be relatively rotatable by the backup plate 73 on the side of the hub 3 defined as the first friction engaged member through the needle bearing 53. Note that the basic structures and operations of the main clutch 4 and of the variable length joint 31 in the eighth embodiment are substantially the same as those in the first embodiment discussed above.

According to the eighth embodiment, with such a construction being adopted, even when the main clutch 4 is not joined, the second plate 37 (i.e., the variable length joint 31) and the hub 3 integrally rotate. Therefore, for example, even the hub 3 makes several thousands of revolutions per minute with respect to the fixed case 61 such as the automobile traveling at a high speed, as in the seventh embodiment, no load in the rotating direction is applied to the needle bearing 53, and the life-span of the needle bearing 53 considerably increases, thereby attaining the extension of the maintenance interval of the automatic transmission.

Figure 13:
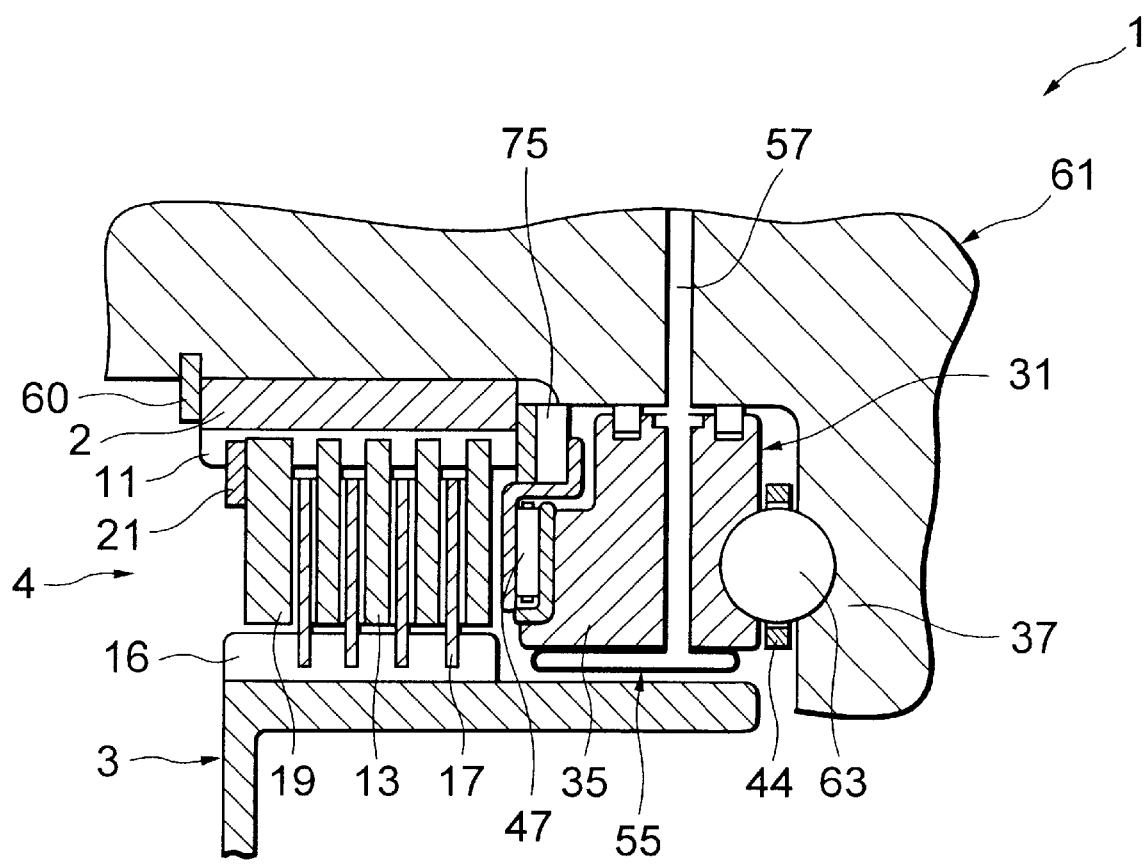
FIG. 13 is a vertical sectional view showing the principal components of the wet type multi-disc clutch in a ninth embodiment of the present invention.

FIG. 13 is a vertical sectional view showing principal components of the wet type multi-disc clutch in a ninth embodiment of the present invention. As illustrated in FIG. 13, this wet type multi-disc clutch 1 is constructed by changing the configuration of the variable length joint 31 as compared with the seventh embodiment discussed above. That is, in the ninth embodiment, the main clutch 4 and the variable length joint 31 are disposed in series as in the seventh embodiment, and the first cam plate 35 frictionally engages with the clutch case 2 by dint of an operation of the wave spring 75. However, the second cam plate 37 is formed integrally with the fixed case 61 defined as a first friction engaged member. Note that the basic structures and operations of the main clutch 4 and of the variable length joint 31 in the ninth embodiment are substantially the same as those in the first embodiment discussed above.

According to the ninth embodiment, with such a construction being adopted, the fixed case 61 and the second cam plate 37 are a single member, and, in combination with an omission of the needle bearing 53, there is actualized the friction engaging device which is structurally compact in the axial direction and requires a small number of constructive members.

Figure 14:
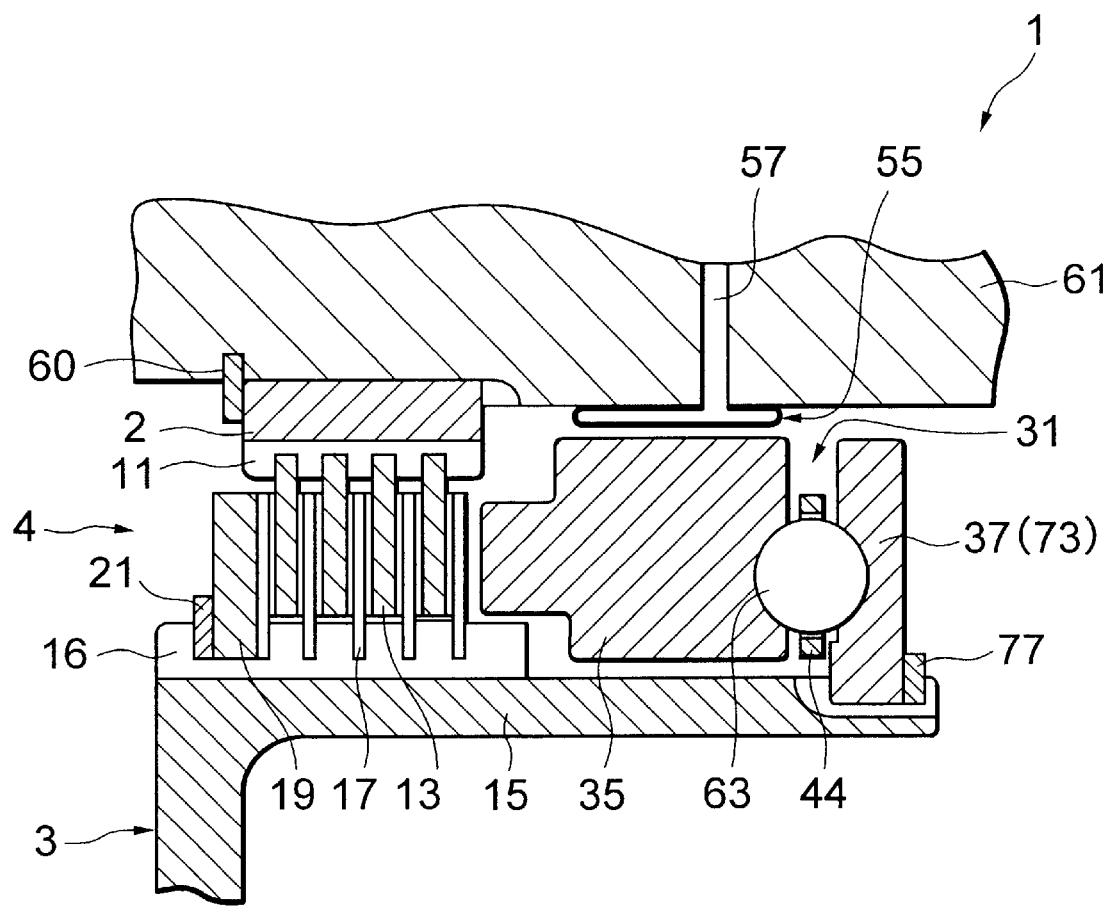
FIG. 14 is a vertical sectional view showing the principal components of the wet type multi-disc clutch in a tenth embodiment of the present invention.

FIG. 14 is a vertical sectional view showing principal components of the wet type multi-disc clutch in a tenth embodiment of the present invention. As illustrated in FIG. 14, this wet type multi-disc clutch 1 is constructed by changing the configuration of the variable length joint 31 as compared with the eighth embodiment discussed above. That is, in the tenth embodiment, the main clutch 4 and the variable length joint 31 are disposed in series as in the eighth embodiment, and the first cam plate 35 engages with the hub 3 through the spline 16. However, the second cam plate 37 is formed integrally with the backup plate 73 on the side of the hub 3 defined as a first friction engaged member. Note that the basic structures and operations of the main clutch 4 and of the variable length joint 31 in the tenth embodiment are substantially the same as those in the first embodiment discussed above.

According to the tenth embodiment, with such a construction being adopted, the backup plate 73 and the second cam plate 37 are a single member, and, in combination with the omission of the needle bearing 53, there is actualized the friction engaging device which is structurally compact in the axial direction and requires a small number of constructive members.

Next, two modified examples of the variable length joint 31 which can be adopted in the first to tenth embodiments, will be explained with reference to FIGS. 15–19.

Figure 15:
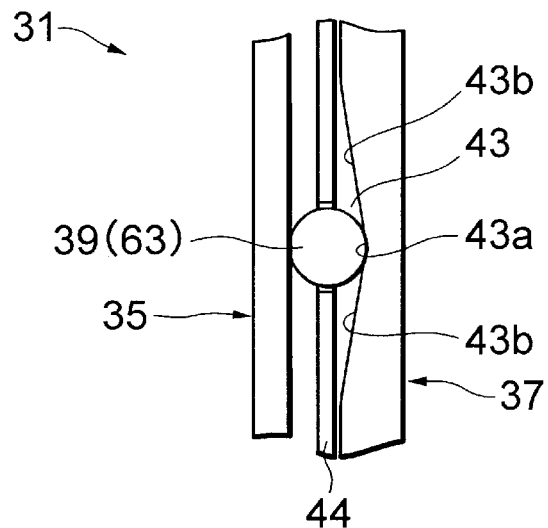
FIG. 15 is an explanatory view showing a structure of a first modified example of a variable length joint.
Figure 16:
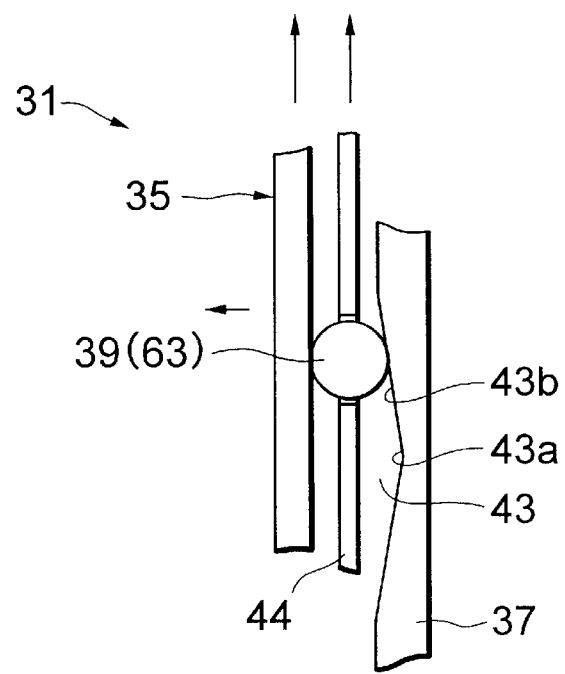
FIG. 16 is an explanatory view showing an operating state of the first modified example of the variable length joint.

What is illustrated in FIG. 15 is a first modified example in which a smooth member having no cam is used as the first cam plate 35, and the roller 39 (or the ball 63) is driven only by the cam 43 formed on the second cam plate 37 to move the first and second cam plates 35, 37 away from each other in the axial direction as shown in FIG. 16. In this modified example also, the same operations and effects as those in the respective embodiments discussed above are obtained, and a cost for manufacturing the first cam plate 35 can be reduced.

Figure 17:
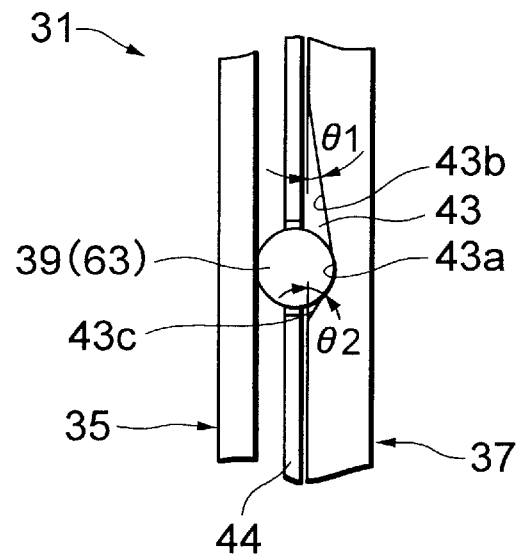
FIG. 17 is an explanatory view showing a structure of a second modified example of the variable length joint.

On the other hand, what is shown in FIG. 17 is a second modified example of the variable length joint 31, wherein the cam 43 of the second cam plate 37 is different in order to add a one-way clutch function to the first modified example described above. To be more specific, the cam 43 has a gently inclined surface (a first inclined surface) 43b formed only one side of the trough 43a, and a comparatively steep inclined surface (a second inclined surface) 43c on the other side. An inclined angle (to the surface perpendicular to the axis of rotation of the second cam plate 37) θ1 of the first inclined surface 43b, is set to a value having a relationship such as $\mu \geq \tan(\theta 1/2)$ with respect to a friction coefficient $\mu$ between the roller 39 (or the ball 63) and the second cam plate 37. Further, an inclined angle θ2 of the second inclined surface 43c is set to a value having a relationship such as $\mu \geq \tan(\theta 2/2)$ under the same condition as the inclined angle θ1.

Figure 18:
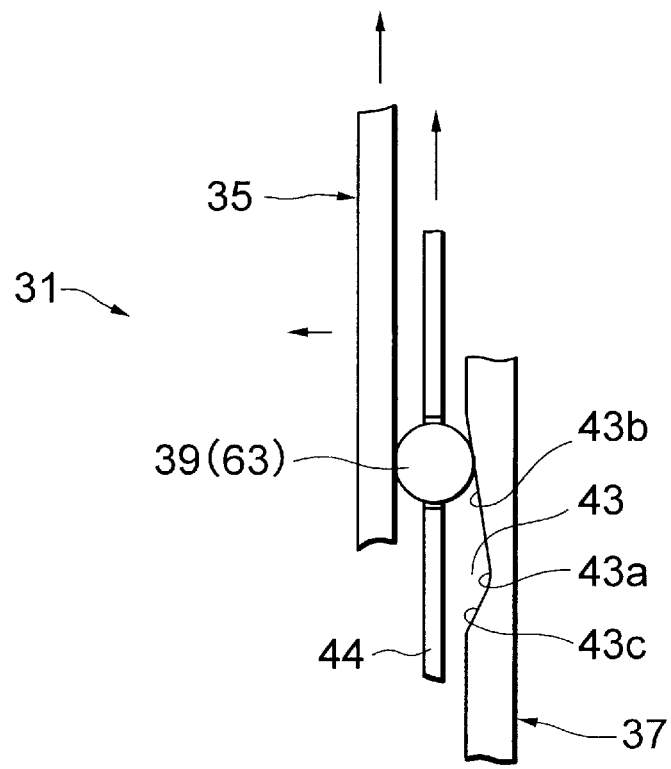
FIG. 18 is an explanatory view showing an operating state of the second modified example of the variable length joint.
Figure 19:
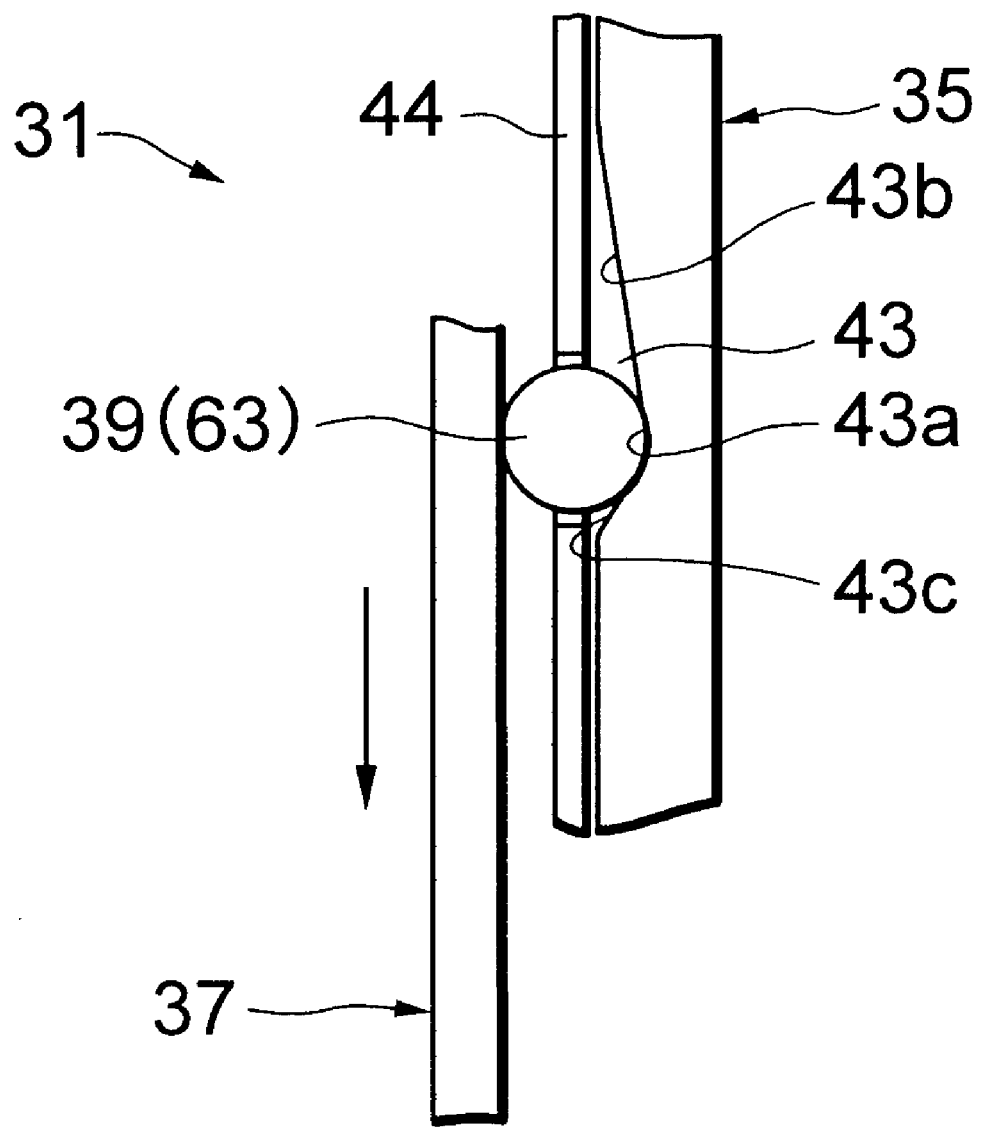
FIG. 19 is an explanatory view showing the operating state of the second modified example of the variable length joint.
Figure 20:
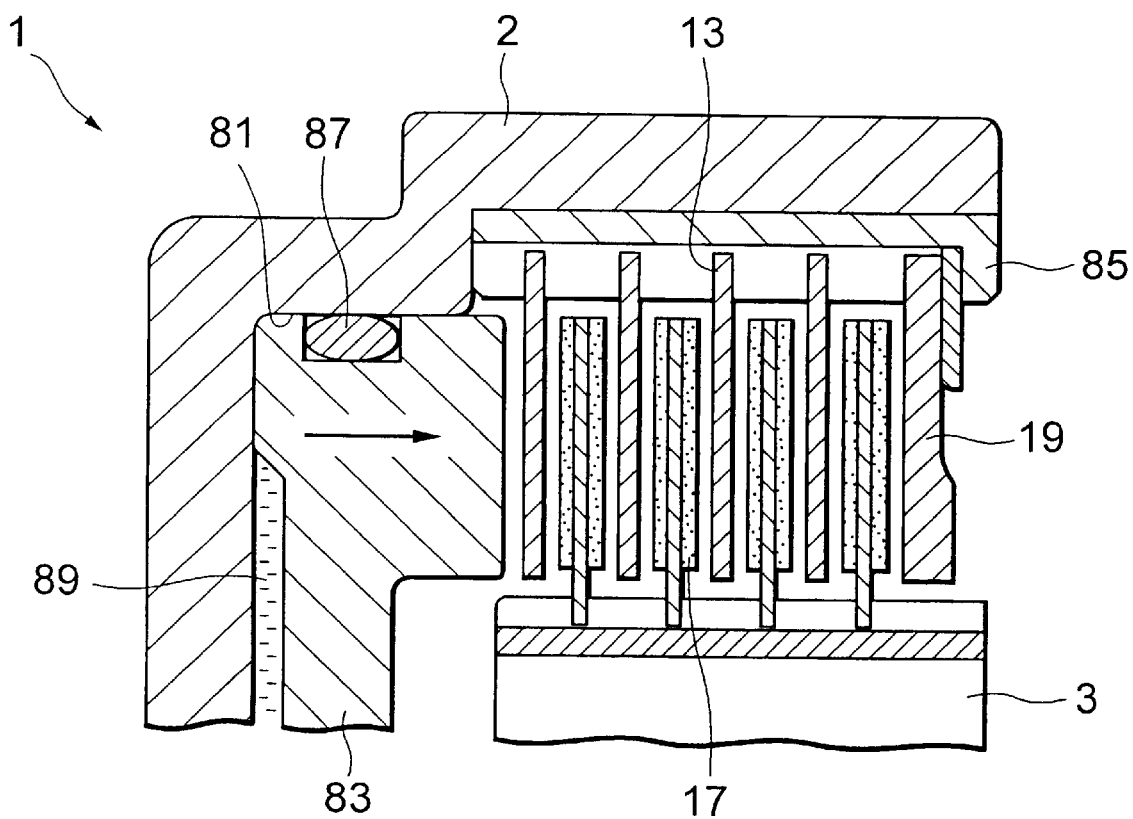
FIG. 20 is a vertical sectional view showing principal components of a prior art wet type multi-disc clutch.

With this contrivance being taken, in the second modified example, when the first cam plate 35 and the second cam plate 37 relatively rotate (forward rotations) in one direction, as shown in FIG. 18, the roller 39 (or the ball 63) rolls without sliding on the first inclined surface 43b. In this case, the first cam plate 35 and the second cam plate 37 move away from each other in the axial direction as in the respective embodiments discussed above, and the variable length joint 31 operates to stretch. When the first and second cam plates 35, 37 relatively rotate (reverse rotations) in the other direction, however, since the inclined angle θ2 of the second inclined surface 43c is set to the value having the relationship such as $\mu \geq \tan(\theta 2/2)$ with respect to the friction coefficient $\mu$ between the roller 39 (or the ball 63) and the second cam plate 37, as shown in FIG. 19, the roller 39 (or the ball 63) continues to slip on the trough 43a and is unable to roll on the second inclined surface 43c. The first cam plate 35 thereby makes only the relative rotations (idling) with respect to the roller 39 (or the ball 63), and the first and second cam plates 35, 37 do not move away from each other in the axial direction.

Given next is an explanation of an operation when the variable length joint 31 in the second modified example is applied to the wet type multi-disc clutch 1 in the first embodiment. Incidentally, it is assumed in the following discussion that the hub 3 on the rotating side frictionally engages with the clutch case 2 on the fixed side, and the relative rotations in the operating direction of the variable length joint 31 be conceived as the forward rotations while the relative rotations in the non-operating direction of the variable length joint 31 be conceived as the reverse rotations. Further, in the second modified example, the clutch case 2 and the separator plate 13 engage with each other through the spline with a predetermined clearance in the rotating direction.

In the second modified example, when the hub 3 rotates forward, as described above, since the variable length joint 31 operates to stretch, as in the embodiments discussed above, main clutch 4 is engaged, and a rotational torque is transferred to the clutch case 2 from the hub 3.

Further, when the hub 3 rotates reversely, the tube type clutch 55 is supplied with the operation pressure oil, and the friction braking force is made act on the second cam plate 37. Even in such a case, as described above, the roller 39 continues to slip on the trough 43a of the second cam plate 37, and the first cam plate 35 also idles with respect to the roller 39. Therefore, the variable length joint 31 does not stretch. As a result, the piston member 45 of the first cam plate 35 is unable to press the main clutch 4, and the engagement of the main clutch is, as a matter of course, not made.

On the other hand, the tube type clutch 55 is engaged when the hub 3 rotates forwards, and the main clutch 4 is thereby engaged, in which state the hub 3 shifts to the reverse rotation from the forward rotation. In this case, the wet type multi-disc clutch 1 operates as follows. When rotating forwards, as explained above, the rotational torque is transferred to the clutch case 2 from the hub 3. When the hub 3 shifts to the reverse rotation from the forward rotation in that state, the rotational torque of the hub 3 decreases down to minus via zero. At that time, the spline engagement between the separator plate 13 and the clutch case 2 has a clearance in the rotating direction, and hence, just when the rotational torque of the hub 3 comes to zero, the first cam plate 35 of the variable length joint 31, the hub 3 and the main clutch 4 become integrally rotatable relative to the clutch case 2.

Then, the reactive force of the thrusting force in the left direction in FIG. 1 acts via the roller 39 upon the first cam plate 35 of the variable length joint 31, and therefore, by dint of a rotating-directional component force of this reactive force, the first cam plate 35, the hub 3 and the main clutch 4 integrally rotate in such a direction the roller 39 rolls on the inclined surface 43b of the cam 43 and fits in the trough 43a between the first cam plate 35 and the second cam plate 37. The first and second cam plates 35, 37 thereby become proximate to each other, and the variable length joint 31 operates to shrink. As a result, the axial length of the variable length joint 31 returns to the initial value, and the thrusting force by the first cam plate 35 disappears, with the result that the main clutch 4 comes into the released state while the hub 3 rotates reversely (idling) with respect to the clutch case 2. On this occasion, the main clutch 4 is kept in the released state described above, and hence there does not occur a reverse torque which has hitherto been a problem inherent in the conventional device. Further, the tube type clutch 55 remains joined, however, in the variable length joint 31, the roller 39 slips on the first cam plate 35 during the reverse rotations, and the rotational torque is not transferred. Hence, the reverse torque caused by that does not occur. Note that there exist the biasing forces of the Belleville spring 23 and of the return spring 49 in the first embodiment, so that the variable length joint 31 can revert to the initial state more surely.

Further, when the hub 3 shifts again to the forward rotations from that state, the first cam plate 35 starts rotating forward with the rotations of the hub 3. Thereupon, the second cam plate 37 is fixed in the rotating direction with respect to the clutch case 2, and hence the relative rotations in the forward rotating direction are produced between the first cam plate 35 and the second cam plate 37. The roller 39 thereby rolls on the inclined surface 43b of the cam 43 of the second cam plate 37, the first and second cam plates 35, 37 move away from each other, and the variable length joint 31 operates to stretch, whereby the main clutch 4 is again joined.

As discussed above, in the wet type multi-disc clutch 1 in the first embodiment where the variable length joint 31 in the second modified example is adopted, the main clutch 4 is engaged and released corresponding to the rotating-directional changes of the hub 3 while the tube type clutch 55 is kept in the engaged state. However, the reverse torque does not occur at all. Note that when adopting the variable length joint 31 in the second modified example is adopted in the second to sixth embodiment, the main clutch 4 is joined and released without causing the reverse torque as in the first embodiment except that there is a partial difference in the rotating operations between the respective members.

Though the discussions on the specific embodiments come to an end, the mode of the present invention is not limited to those embodiments. For example, in each of the embodiments discussed above, the present invention is applied to the friction engaging device incorporated into the automatic transmission for the automobile. However, the present invention may also be applied to other friction engaging devices such as a clutch device for a power disconnection in the motorcycle and a clutch device for industry machine. Further, in each of the embodiments described above, the variable length joint based on the cam mechanism is adopted. However, a variable length joint based on a screw mechanism etc may also be adopted. In this case also, substantially the same operation can be attained. Moreover, the first friction engaging member may involve the use of a variety of clutches such as a single disc clutch and a cone clutch etc in addition to the above-described wet type multi-disc clutch on condition that they can be operated by the axial thrusting force. Furthermore, the wet type multi-disc clutch etc may be adopted as the second friction engaging member in place of the tube type clutch and the band type brake described above. Further, the operation pressure oil explained above may be replaced with compressed air and electromagnetic force etc as an operation source of the second friction engaging member. As for others, the configurations and operations of the respective members constituting the device may properly be changed without departing from the sprit of the present invention within the scope of the present invention.

According to the first through sixth aspects of the present invention, it is feasible to attain the friction engaging device capable of having a large transfer torque capacity and smoothly unrestrictedly performing the engagement and release without using highly precise and expensive parts or requiring the operation high-pressure oil and a multiplicity of components.

In the friction engaging devices according to the seventh through twelfth aspects of the present invention, the relative rotations between the variable length joint and the first friction engaged member are not caused when in a non-engagement of the first friction engaging member, and it is possible to prevent the maintenance interval from being reduced due to a decrease in life-span of the needle bearing etc.

According to the thirteenth through fifteenth aspects of the present invention, it is possible to realize the friction engaging device capable of performing the automatic engagement and release of the first friction engaging member without occurrence of undesired reverse torque only by the rotating-directional changes of one friction engaged member while the second friction engaging member remains engaged. Then, in the case of mounting the friction engaging device in the automatic transmission for the automobile, the speed can be smoothly changed with no shift shock without a clutch-to-clutch operation etc when shifted down.

Moreover, according to the sixteenth aspect of the present invention, the number of constructive members of the variable length joint can be reduced, and it is therefore feasible to attain the friction engaging device which is compact in structure and requires the small number of components.

What is claimed is:

1. A friction engaging device comprising:
   a first friction engaged member;
   a second friction engaged member so held as to be relatively rotatable with respect to said first friction engaged member;
   first friction engaging means used for providing a friction engagement between said first friction engaged member and said second friction engaged member;
   a variable length joint provided between said first friction engaging means and said first friction engaged member, and including a first operation element facing to said first friction engaging means and movable in an axial direction and a second operation element so held as to be only relatively rotatable with respect to said first friction engaged member, any one of said first and second operation elements rotating with said second friction engaged member, said first and second operation elements moving away from each other in the axial direction corresponding to the relative rotations in order to make said first friction engaging means perform the engaging operation on one hand, and becoming proximal to each other in the axial direction on the other hand, thus making the relative rotations; and
   second friction engaging means used for providing a friction engagement between said first operation element or said second operation element which does not rotate with said second friction engaged member, and said first friction engaged member;
   said second friction engaging means including a tube type clutch.

2. A friction engaging device according to claim 1, further comprising a return spring, interposed between said first friction engaged member or said second friction engaged member and said first operation element, for biasing said first operation element in such a direction as to move away from said first friction engaging means in the axial direction.

3. A friction engaging device according to claim 1, wherein said first friction engaging means includes:
   a first clutch element rotating with any one of said first friction engaged member and said second friction engaged member;
   a second clutch element rotating with any other of said first friction engaged member and said second friction engaged member; and
   a friction material formed on at least any one of said first clutch element and said second clutch element, and used for providing a friction engagement between said two clutch elements.

4. A friction engaging device according to claim 1, wherein an operation source of said second friction engaging means is a pressure fluid.

5. A friction engaging device comprising:
   a first friction engaged member;
   a second friction engaged member so held as to be relatively rotatable with respect to said first friction engaged member;
   first friction engaging means used for providing a friction engagement between said first friction engaged member and said second friction engaged member;
   a variable length joint provided between said first friction engaging means and said first friction engaged member, and including a first operation element facing to said first friction engaging means and movable in an axial direction and a second operation element so held as to be only relatively rotatable with respect to said first friction engaged member, said first and second operation elements rotating integrally with said first friction engaged member, then moving away from each other in the axial direction corresponding to the relative rotations in order to make said first friction engaging means perform the engaging operation on one hand, and becoming proximal to each other in the axial direction on the other hand, thus making the relative rotations; and second friction engaging means used for providing a friction engagement between said first operation element or said second operation element and said second friction engaged member;

said second friction engaging means including a tube type clutch.

6. A friction engaging device according to claim 5, further comprising a return spring, interposed between said first friction engaged member or said second friction engaged member and said first operation element, for biasing said first operation element in such a direction as to move away from said first friction engaging means in the axial direction.

7. A friction engaging device according to claim 5, wherein said first friction engaging means includes:
a first clutch element rotating with any one of said first friction engaged member and said second friction engaged member;
a second clutch element rotating with any other of said first friction engaged member and said second friction engaged member; and
a friction material formed on at least any one of said first clutch element and said second clutch element, and used for providing a friction engagement between said two clutch elements.

8. A friction engaging device according to claim 5, wherein an operation source of said second friction engaging means is a pressure fluid.

9. A friction engaging device according to claim 1, wherein said variable length joint is constructed so that said first and second operation elements move away from each other in the axial direction corresponding to the relative rotations in one direction in order to make said first friction engaging means perform the engaging operation on one hand, and become proximal to each other in the axial direction on the other hand, thus making the relative rotations in the other direction.

10. A friction engaging device comprising:
a first friction engaged member;
a second friction engaged member so held as to be relatively rotatable with respect to said first friction engaged member;
first friction engaging means used for providing a friction engagement between said first friction engaged member and said second friction engaged member;
a variable length joint provided between said first friction engaging means and said first friction engaged member, and including a first operation element facing to said first friction engaging means and movable in an axial direction and a second operation element so held as to be only relatively rotatable with respect to said first friction engaged member, any one of said first and second operation elements rotating with said second friction engaged member, said first and second operation elements moving away from each other in the axial direction corresponding to the relative rotations in order to make said first friction engaging means perform the engaging operation on one hand, and becoming proximal to each other in the axial direction on the other hand, thus making the relative rotations; and second friction engaging means used for providing a friction engagement between said first operation element or said second operation element which does not rotate with said second friction engaged member, and said first friction engaged member;

wherein said variable length joint is constructed so that said first and second operation elements move away from each other in the axial direction corresponding to the relative rotations in one direction in order to make said first friction engaging means perform the engaging operation on one hand, and become proximal to each other in the axial direction on the other hand, thus making the relative rotations in the other direction, said variable length joint further includes a third operation element interposed between said first operation element and said second operation element, a cam is formed on at least one of a contact surface between said first operation element and said third operation element, and a contact surface between said second operation element and said third operation element, and an inclined angle $\theta$ of said cam and a friction coefficient $\mu$ between said first operation element and said third operation element or between second operation element and said third operation element, have a relationship $\mu \geq \tan(\theta/2)$ with respect to the relative rotations in such a direction that said first operation element and said second operation element move away from each other in the axial direction, and have a relationship $\mu < \tan(\theta/2)$ with respect to the relative rotations in such a direction that said first operation element and said second operation element do not move away from each other in the axial direction.

11. A friction engaging device according to claim 9, wherein said variable length joint further includes a third operation element interposed between said first operation element and said second operation element,
both of the contact surface between said first operation element and said third operation element and the contact surface between said second operation element and said third operation element, are plane, and
said third operation element is a sprag operating only for the relative rotations in such a direction that said first operation element and said second operation element move away from each other in the axial direction.

12. A friction engaging device according to claim 1, wherein any one of said first operation element and said second operation element is integral with said first friction engaged member or said second friction engaged member.

* * * * *